(12) United States Patent
Zhang et al.

(10) Patent No.: US 9,926,957 B2
(45) Date of Patent: Mar. 27, 2018

(54) FITTING FOR STRUT CHANNEL

(71) Applicant: Cooper Technologies Company, Houston, TX (US)

(72) Inventors: Zhihui Zhang, Edwardsville, IL (US); Qiang Li, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 592 days.

(21) Appl. No.: 14/541,812

(22) Filed: Nov. 14, 2014

(65) Prior Publication Data

US 2016/0138625 A1 May 19, 2016

(51) Int. Cl.
| | |
|---|---|
| *F16B 2/14* | (2006.01) |
| *F16S 3/02* | (2006.01) |
| *F16B 7/18* | (2006.01) |
| *F16B 37/04* | (2006.01) |
| *E04C 3/07* | (2006.01) |
| *E04C 3/04* | (2006.01) |

(52) U.S. Cl.
CPC ............... *F16B 2/14* (2013.01); *F16B 7/18* (2013.01); *F16B 37/042* (2013.01); *F16S 3/02* (2013.01);
(Continued)

(58) Field of Classification Search
CPC ............ E04C 3/07; E04C 2003/0417; E04C 2003/0452; F16B 2/14; F16B 7/0433;
(Continued)

(56) References Cited

U.S. PATENT DOCUMENTS

| | | |
|---|---|---|
| 1,319,652 A | 10/1919 | Korns |
| 1,813,545 A | 7/1931 | Reinhold |
| (Continued) | | |

FOREIGN PATENT DOCUMENTS

| | | |
|---|---|---|
| CN | 202416847 U | 9/2012 |
| DE | 7701100 | 5/1977 |
| (Continued) | | |

OTHER PUBLICATIONS

"A guide to threadlocking adhesives." Reliable Plant. May 28, 2013, [online], [retrieved on Apr. 27, 2017]. Retrieved from the Internet <URL: https://web.archive.org/web/20130528020650/http://www.reliableplant.com/Read/27159/Guide-to-threadlocking-adhesives>.*

(Continued)

*Primary Examiner* — Josh Skroupa
(74) *Attorney, Agent, or Firm* — Senniger Powers LLP

(57) ABSTRACT

A fitting for connecting first and second pieces of strut to one another includes a coupling component. The coupling component has first and second coupling portions configured for reception in respective fitting grooves of the first and second pieces of strut when the coupling component is in a first orientation. Each of the coupling portions are rotatable within the respective fitting grooves from the first orientation to a second orientation to connect the first and second pieces of strut to one another. An anti-rotation plate is connected to the coupling component. The anti-rotation plate has an unlocked position relative to the coupling component to allow the first and second coupling portions to be received in the respective fitting grooves, and a locked position relative to the coupling component to inhibit rotation of each of the first and second coupling portions from the second orientation to the first orientation.

16 Claims, 23 Drawing Sheets

(52) U.S. Cl.
CPC ........ *E04C 3/07* (2013.01); *E04C 2003/0417* (2013.01); *E04C 2003/0452* (2013.01); *Y10T 403/7123* (2015.01)

(58) Field of Classification Search
CPC .......... F16B 7/18; F16B 7/187; F16B 37/042; F16S 3/02; Y10T 403/3906; Y10T 403/4674; Y10T 403/4677; Y10T 403/645; Y10T 403/7117; Y10T 403/7123; Y10T 403/76
USPC ..... 403/188, 256, 257, 337, 387, 388, 409.1
See application file for complete search history.

(56) References Cited

U.S. PATENT DOCUMENTS

| | | |
|---|---|---|
| 1,934,760 A | 11/1933 | Awbrey |
| 1,963,908 A | 6/1934 | Manasek |
| 2,307,653 A | 1/1943 | Wright |
| 2,375,513 A | 5/1945 | Bach |
| 2,420,826 A | 5/1947 | Irrgang |
| 2,470,991 A | 5/1949 | Kindorf et al. |
| 2,567,463 A | 9/1951 | Atkinson |
| 2,676,680 A | 4/1954 | Kindort |
| 2,767,609 A | 10/1956 | Cousino |
| 2,767,951 A | 10/1956 | Cousino |
| 2,804,180 A | 8/1957 | Richardson |
| 2,846,169 A | 8/1958 | Sulllivan |
| 2,944,642 A | 7/1960 | Evans |
| 3,005,292 A | 10/1961 | Reiland |
| 3,226,069 A | 12/1965 | Clarke |
| 3,266,761 A | 4/1966 | Walton et al. |
| 3,310,264 A | 3/1967 | Appleton |
| 3,312,034 A | 4/1967 | Steinmann |
| 3,396,499 A | 8/1968 | Biffani |
| 3,417,951 A | 12/1968 | Rebentisch, Jr. |
| 3,451,183 A | 6/1969 | Lespagnol et al. |
| 3,463,428 A | 8/1969 | Kindorf et al. |
| 3,486,726 A | 12/1969 | Kindorf et al. |
| 3,513,606 A | 5/1970 | Jones |
| 3,527,432 A | 9/1970 | Lytle |
| 3,547,385 A | 12/1970 | Kindorf |
| 3,566,561 A | 3/1971 | Tozer |
| 3,592,493 A | 7/1971 | Goose |
| 3,601,347 A | 8/1971 | Attwood |
| 3,612,461 A | 10/1971 | Brown |
| 3,650,499 A | 3/1972 | Biggane |
| 3,748,808 A | 7/1973 | Shepard et al. |
| 3,752,198 A | 8/1973 | Fiorentino et al. |
| 3,757,485 A | 9/1973 | Vincens |
| 3,836,936 A | 9/1974 | Clement |
| 3,863,300 A | 2/1975 | Becker |
| 3,944,308 A | 3/1976 | Persson |
| 3,986,314 A | 10/1976 | Moeller |
| 3,998,419 A | 12/1976 | Semmerling |
| 4,044,428 A | 8/1977 | Kowalski |
| 4,185,802 A | 1/1980 | Myles et al. |
| 4,211,381 A | 7/1980 | Heard |
| 4,216,930 A | 8/1980 | Rossler, Jr. et al. |
| 4,227,355 A | 10/1980 | Wendt |
| 4,358,216 A | 11/1982 | Pleickhardt et al. |
| 4,379,651 A | 4/1983 | Nagashima |
| 4,397,437 A | 8/1983 | Madej |
| 4,417,711 A | 11/1983 | Madej |
| 4,479,341 A | 10/1984 | Schuplin |
| 4,490,064 A | 12/1984 | Ducharme |
| 4,506,418 A | 3/1985 | Viola et al. |
| 4,516,296 A | 5/1985 | Sherman |
| 4,610,562 A | 9/1986 | Dunn |
| 4,637,748 A | 1/1987 | Beavers |
| 4,657,458 A | 4/1987 | Woller et al. |
| 4,666,355 A * | 5/1987 | Stover .................. F16B 37/046 411/104 |
| 4,708,554 A | 11/1987 | Howard |
| 4,726,165 A | 2/1988 | Brinsa |
| 4,729,532 A | 3/1988 | Moss |
| 4,784,552 A | 11/1988 | Rebentisch |
| 4,830,531 A | 5/1989 | Condit et al. |
| 4,895,412 A | 1/1990 | Deley et al. |
| 4,934,886 A | 6/1990 | Aikens |
| 4,948,313 A | 8/1990 | Zankovich |
| 4,950,099 A | 8/1990 | Roellin |
| 4,961,553 A | 10/1990 | Todd |
| 4,993,670 A | 2/1991 | Tesar |
| 5,014,940 A | 5/1991 | Sherman |
| 5,022,614 A | 6/1991 | Rinderer |
| D322,929 S | 1/1992 | Abbestam et al. |
| 5,078,537 A | 1/1992 | Nomura |
| 5,102,074 A | 4/1992 | Okada |
| 5,116,161 A * | 5/1992 | Faisst ...................... F16B 7/187 296/29 |
| 5,118,233 A * | 6/1992 | Mitchell ............... F16B 31/021 411/2 |
| 5,141,186 A | 8/1992 | Cusic |
| 5,146,724 A | 9/1992 | Angelo |
| 5,163,644 A | 11/1992 | Kowalski |
| 5,175,971 A | 1/1993 | McCombs |
| 5,205,022 A | 4/1993 | Norton |
| 5,215,281 A | 6/1993 | Sherman |
| 5,228,263 A | 7/1993 | Vaughn |
| 5,268,598 A | 12/1993 | Pedersen et al. |
| 5,271,586 A | 12/1993 | Schmidt |
| 5,274,888 A | 1/1994 | Payne |
| 5,335,890 A | 8/1994 | Pryor et al. |
| 5,351,926 A | 10/1994 | Moses |
| 5,375,798 A | 12/1994 | Hungerford, Jr. |
| 5,489,173 A | 2/1996 | Höfle |
| 5,503,511 A | 4/1996 | Flamme |
| 5,566,916 A | 10/1996 | Bailey |
| 5,595,363 A | 1/1997 | De Leebeeck |
| 5,628,508 A | 5/1997 | Koole |
| 5,655,816 A | 8/1997 | Magnuson et al. |
| 5,655,865 A | 8/1997 | Plank et al. |
| 5,718,403 A | 2/1998 | Ott et al. |
| 5,729,948 A | 3/1998 | Levy et al. |
| 5,746,535 A | 5/1998 | Kohler |
| 5,779,412 A | 7/1998 | Nagai et al. |
| 5,799,452 A | 9/1998 | Moore |
| 5,799,907 A | 9/1998 | Andronica |
| 5,806,268 A | 9/1998 | Koller |
| 5,806,897 A | 9/1998 | Nagai et al. |
| 5,820,322 A | 10/1998 | Hermann et al. |
| 5,833,417 A | 11/1998 | Sargent et al. |
| 5,855,342 A | 1/1999 | Hawkins et al. |
| 5,864,997 A | 2/1999 | Kelly |
| 5,918,999 A | 7/1999 | Lamarca |
| 5,924,650 A | 7/1999 | Richichi |
| 5,927,041 A | 7/1999 | Sedlmeier et al. |
| 5,934,818 A | 8/1999 | Schmitt et al. |
| 5,970,679 A | 10/1999 | Amore |
| 5,984,243 A | 11/1999 | Pfaller et al. |
| 5,988,930 A | 11/1999 | Liebetrau et al. |
| 6,061,984 A | 5/2000 | Rose |
| 6,062,764 A | 5/2000 | Rixen et al. |
| 6,106,189 A | 8/2000 | Seale |
| 6,195,953 B1 | 3/2001 | Gitter et al. |
| 6,322,030 B1 | 11/2001 | Marra |
| 6,347,904 B1 | 2/2002 | Knighton |
| 6,454,232 B1 | 9/2002 | Roth |
| 6,484,358 B1 | 11/2002 | Duong et al. |
| 6,494,415 B1 | 12/2002 | Roth |
| 6,561,473 B1 | 5/2003 | Ianello |
| 6,572,057 B1 | 6/2003 | Roth |
| 6,588,713 B2 | 7/2003 | Kilkenny |
| 6,655,099 B1 | 12/2003 | Trenoweth |
| 6,660,938 B2 | 12/2003 | Herb et al. |
| 6,679,461 B1 | 1/2004 | Hawkins |
| 6,682,253 B2 | 1/2004 | Binna et al. |
| 6,712,543 B1 | 3/2004 | Schmalzhofer |
| 6,726,117 B2 | 4/2004 | Herb et al. |
| 6,751,914 B2 | 6/2004 | Zeh et al. |
| 6,766,992 B1 | 7/2004 | Parker |
| 6,802,171 B2 | 10/2004 | McKinnon |
| 6,991,198 B1 | 1/2006 | Roth |

(56) References Cited

U.S. PATENT DOCUMENTS

| | | |
|---|---|---|
| 7,014,213 B1 | 3/2006 | Kaiser |
| 7,044,701 B2 | 5/2006 | Herb |
| 7,070,374 B2* | 7/2006 | Womack .............. B61D 45/001 410/104 |
| 7,096,641 B2 | 8/2006 | Birnbaum et al. |
| 7,179,010 B2 | 2/2007 | Weger et al. |
| 7,240,884 B2 | 7/2007 | Shim |
| 7,287,733 B2 | 10/2007 | Bongio et al. |
| 7,389,621 B2 | 6/2008 | Hawes |
| 7,448,822 B2 | 11/2008 | Nebeker et al. |
| 7,478,787 B2 | 1/2009 | Bankston et al. |
| 7,484,697 B1 | 2/2009 | Nelson |
| 7,600,724 B2 | 10/2009 | Nelson et al. |
| 7,604,444 B2 | 10/2009 | Wu |
| 7,661,915 B2 | 2/2010 | Whipple |
| 7,818,925 B2 | 10/2010 | Benedict |
| 7,922,130 B2 | 4/2011 | Hawkins |
| 7,922,417 B2 | 4/2011 | Jimenez |
| 7,934,896 B2 | 5/2011 | Schnier |
| 7,984,601 B2 | 6/2011 | Birnbaum et al. |
| 8,100,600 B2 | 1/2012 | Blum |
| D654,064 S | 2/2012 | Sergi |
| 8,225,581 B2 | 7/2012 | Strickland et al. |
| 8,277,158 B2 | 10/2012 | Csik et al. |
| 8,303,223 B2 | 11/2012 | Rass et al. |
| 8,341,913 B2 | 1/2013 | Meres et al. |
| 8,366,340 B2 | 2/2013 | Munakata et al. |
| 8,454,259 B2 | 6/2013 | Oetlinger |
| 8,465,242 B2 | 6/2013 | Arendt et al. |
| 8,511,929 B2 | 8/2013 | Raye et al. |
| 8,523,923 B2 | 9/2013 | Thomke et al. |
| 8,567,030 B2 | 10/2013 | Koch et al. |
| 8,596,009 B2 | 12/2013 | Baxter et al. |
| 8,661,765 B2 | 3/2014 | Schaefer et al. |
| 8,662,455 B2 | 3/2014 | Hernandez et al. |
| 8,695,296 B2 | 4/2014 | Bergman |
| D728,753 S | 5/2015 | Hikoyama |
| 9,187,898 B1 | 11/2015 | Underkofler et al. |
| 9,194,418 B2 | 11/2015 | Parthibhan et al. |
| 9,249,994 B2 | 2/2016 | Zuritis |
| 2002/0000498 A1 | 1/2002 | Workman |
| 2002/0060280 A1 | 5/2002 | Yaphe et al. |
| 2002/0110435 A1 | 8/2002 | Herb et al. |
| 2002/0122691 A1 | 9/2002 | Wood |
| 2003/0042033 A1 | 3/2003 | Herb et al. |
| 2003/0043033 A1 | 3/2003 | Lee |
| 2003/0063961 A1 | 4/2003 | Lay |
| 2003/0122044 A1 | 7/2003 | Unverzagt et al. |
| 2003/0159397 A1 | 8/2003 | Birnbaum |
| 2003/0185643 A1 | 10/2003 | Thompson |
| 2004/0165943 A1 | 8/2004 | Herb |
| 2004/0165947 A1 | 8/2004 | Herb |
| 2004/0165965 A1 | 8/2004 | Unverzagt et al. |
| 2004/0228681 A1 | 11/2004 | Herb |
| 2005/0116123 A1 | 6/2005 | Bailey et al. |
| 2005/0129458 A1 | 6/2005 | Hoffmann |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |
| 2007/0248793 A1 | 10/2007 | Herb et al. |
| 2008/0217490 A1 | 9/2008 | Bucciferro et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1 | 5/2012 | Chen |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2013/0047541 A1* | 2/2013 | Mayer ................... E04B 9/366 52/506.05 |
| 2014/0042286 A1 | 2/2014 | Jaffari |
| 2014/0091050 A1 | 4/2014 | Zhang |
| 2014/0093307 A1 | 4/2014 | Zhang |
| 2014/0097304 A1 | 4/2014 | Mastro |
| 2014/0197284 A1 | 7/2014 | Hikoyama |
| 2014/0283475 A1 | 9/2014 | Zhang et al. |
| 2015/0276092 A1 | 10/2015 | Oliver et al. |
| 2015/0322669 A1 | 11/2015 | Shih |

FOREIGN PATENT DOCUMENTS

| | | |
|---|---|---|
| DE | 8232700 U1 | 6/1983 |
| DE | 3513382 A1 | 10/1986 |
| DE | 8704502 U1 | 7/1987 |
| DE | 102006035405 A1 | 5/2008 |
| DE | 202010004406 U1 | 7/2010 |
| DE | 102009000603 A1 | 9/2010 |
| DE | 20 2012 102 394 U1 | 9/2012 |
| EP | 0592743 A1 | 4/1994 |
| EP | 2 838 170 B1 | 3/2016 |
| GB | 569377 | 5/1945 |
| GB | 687403 | 2/1953 |
| GB | 1157545 | 7/1969 |
| GB | 1370645 | 10/1974 |
| JP | 2000139583 | 5/2000 |
| WO | 9837349 A1 | 8/1998 |
| WO | 2006085185 A1 | 8/2006 |
| WO | 2013125821 A1 | 8/2013 |
| WO | 2014159372 A1 | 10/2014 |

OTHER PUBLICATIONS

"Dovetail." Google.com. [online], [retrieved on Sep. 18, 2017]. Retrieved from the Internet <URL: https://www.google.com/search?q=define%3A+dovetail.*

Power-Strut Engineering Catalog, Tyco International. 2008, retrieved on Jan. 5, 2016, http://www.power-strut.com/DB/PDF1/Power-Strut-Catalog_2008.pdf, pp. 63, 65.

Unistrut General Engineering Catalog. Catalog [online]. Unistrut Corporation. Mar. 1, 1998, retrieved on Jan. 5, 2016, http://www.unistrut.us/DB/PDF_Archive/No_12.pdf, pp. 117, 118.

PCT International Search Report and Written Opinion for application No. PCT/US2015/060623, dated Jan. 27, 2016, 12 pages.

Drawing of MQM Wing Nut, (at least as early as Mar. 13, 2012), (1) pg.

Hilti MI/MZ Technical Guide, 4.2 MQ System Components—Load Data and Material Specifications, MQM Wing Nut, (at least as early as Mar. 13, 2012), 1 page, www.us.hilti.com, Canada.

Unistrut, P1000® & P1001 Channels, (at least as early as Mar. 13, 2012), 1 page.

Unistrut, P1100® & P1101 Channels, (at least as early as Mar. 13, 2012), 1 page.

Unistrut, P2000® & P2001 Channels, (at least as early as Mar. 13, 2012), 1 page.

Unistrut, Channels Nuts, Top Retainer Nut, (at least as early as Mar. 13, 2012), 1 page.

Power-Strut Engineering Catalog, Pictorial Table of Contents, (at least as early as Mar. 13, 2012), pp. 11-14, www.alliedeg.

B-Line by Eaton—Channel Nuts & Hardware, Strut Systems, (at least as early as Mar. 13, 2012), pp. 45-53.

"Dovetail" Google.com, retrieved online on Sep. 18, 2017 from URL:https://www.google.com/search/?q+define%A+dovetail.

* cited by examiner

FITTING FOR STRUT CHANNEL

FIELD OF THE DISCLOSURE

The present disclosure generally relates to a fitting for use with strut channel.

BACKGROUND

Strut channel or channel framing, also referred to as simply "strut," is used in the construction and electrical industries for structural support, often for supporting wiring, plumbing, or mechanical components such as air conditioning or ventilation systems. Strut is usually formed from metal sheet, folded over into an open channel shape with interned lips to provide additional stiffness and as a location to mount fittings for securing one or more components to the strut. In some applications, it is desirable to mount pieces of strut together in side-by-side relationship. The conventional way to attach multiple pieces of strut is to weld the strut together, which is time consuming and costly.

SUMMARY

In one aspect, a fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, includes a coupling component. The coupling component has first and second coupling portions configured for reception in respective fitting grooves of the first and second pieces of strut when the coupling component is in a first orientation relative to the respective fitting grooves. Each of the first and second coupling portions are rotatable within the respective fitting grooves from the first orientation to a second orientation to connect the first and second pieces of strut to one another such that the fitting sides of the first and second pieces of strut are juxtaposed and face one another. An anti-rotation plate is connected to the coupling component. The anti-rotation plate has an unlocked position relative to the coupling component to allow the first and second coupling portions to be received in the respective fitting grooves, and a locked position relative to the coupling component to inhibit rotation of each of the first and second coupling portions from the second orientation to the first orientation.

In another aspect, a system for attaching two pieces of strut includes a first piece of strut comprising a fitting side defining a first fitting groove. A second piece of strut comprises a fitting side defining a second fitting groove. A fitting comprises a coupling component having first and second coupling portions configured for reception in the respective first and second fitting grooves of the first and second pieces of strut when the coupling component is in a first orientation relative to the respective fitting grooves. Each of the first and second coupling portions are rotatable within the respective fitting grooves from the first orientation to a second orientation to connect the first and second pieces of strut to one another such that the fitting sides of the first and second pieces of strut are juxtaposed and face one another. An anti-rotation plate is connected to the coupling component. The anti-rotation plate has an unlocked position relative to the coupling component to allow the first and second coupling portions to be received in the respective fitting grooves when the coupling component is in the first orientation, and a locked position relative to the coupling component to inhibit rotation of each of the first and second coupling portions from the second orientation to the first orientation.

In yet another aspect, a method of attaching two pieces of strut comprises providing a first piece of strut having a fitting side defining a first fitting groove. The first fitting groove has a bottom wall defining a slot-shaped opening. A second piece of strut having a fitting side defining a second fitting groove is provided. A fitting comprising a coupling component configured for attachment to both the first and second pieces of strut and an anti-rotation plate having a locked position relative to the coupling component configured to prevent rotation of the coupling component upon attachment of the fitting to the first and second pieces of strut is provided. The fitting is inserted in a first orientation into the first fitting groove through the slot-shaped opening. The coupling component is rotated relative to the anti-rotation plate to a second orientation to connect the first and second pieces of strut to one another such that the fitting sides of the first and second pieces of strut are juxtaposed and face one another. Rotating the coupling component causes the anti-rotation plate to be in the locked position relative to the coupling component to inhibit rotation of the coupling component from the second orientation to the first orientation.

DETAILED DESCRIPTION

Figure 1:
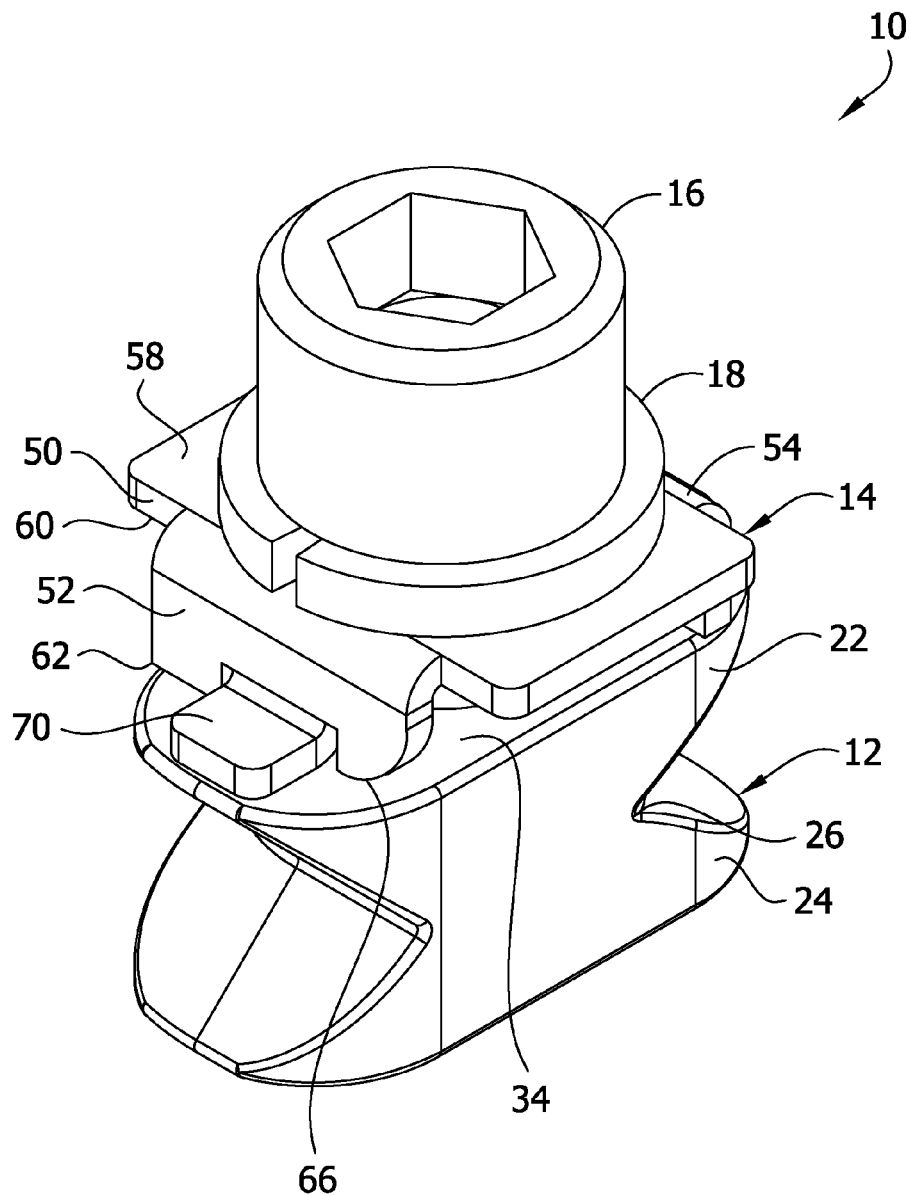
FIG. 1 is a perspective of a fitting for use in connecting two pieces of strut together, including an anti-rotation plate of the fitting in a first (unlocked) position.

Referring to FIGS. 1-5, a fitting for mounting together strut channel (also referred to in the below disclosure as simply "strut") is generally indicated at 10. The fitting 10 is configured for use with strut having a fitting attachment structure, as described in detail below. In the illustrated embodiment, the fitting 10 is a dual dovetail fitting configured for use with strut having a dovetail fitting attachment structure, although other fitting and fitting attachment structure configurations are within the scope of the present invention.

The fitting 10 includes a coupling component 12, an anti-rotation plate 14, and a fastener (e.g., bolt 16) configured to attach the coupling component and the anti-rotation plate. The fitting 10 optionally also includes a washer such as lock washer 18 positioned adjacent the anti-rotation plate 14 opposite the coupling component 12.

Figure 7:
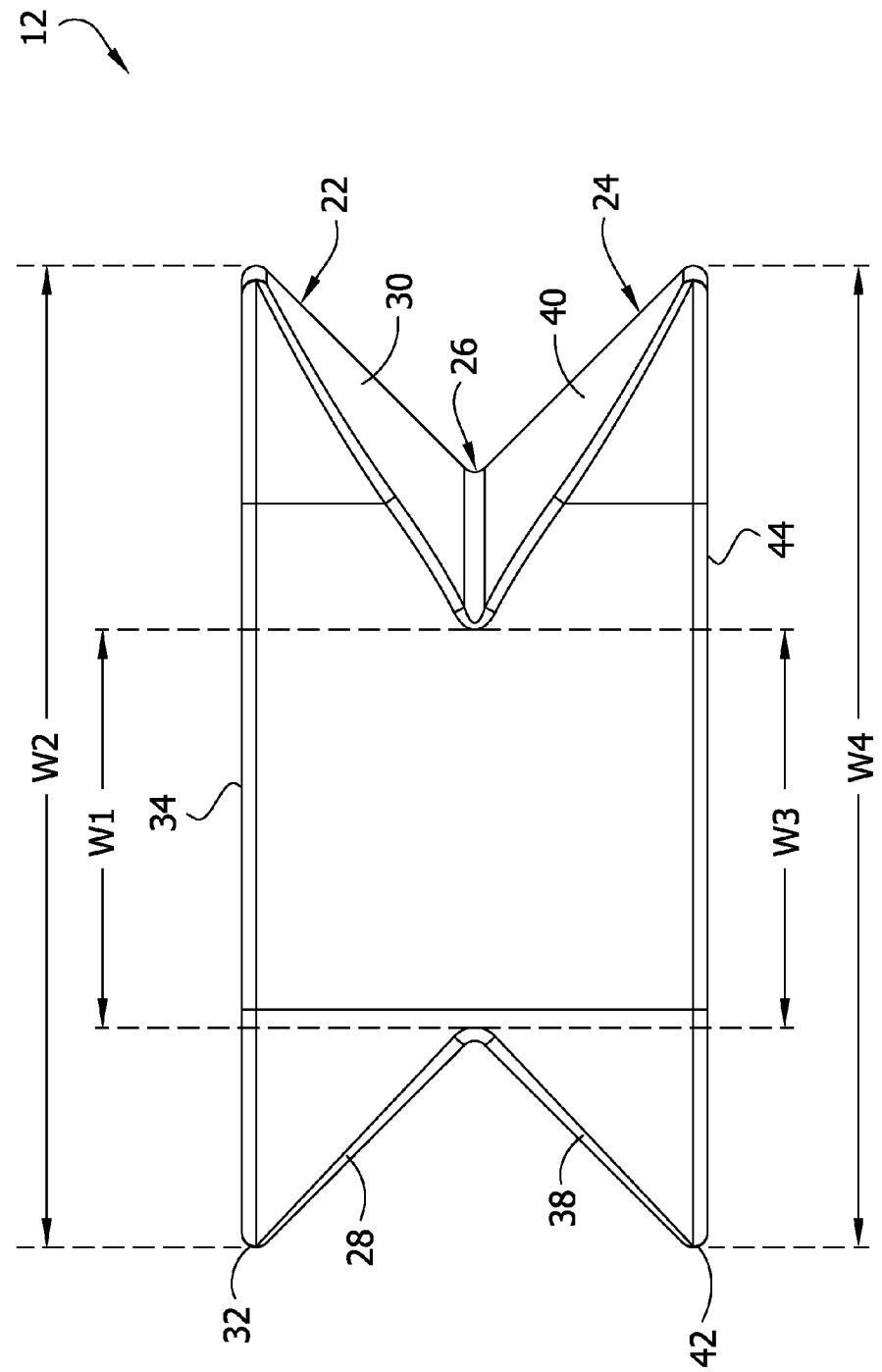
FIG. 7 is a front elevation of FIG. 6.
Figure 8:
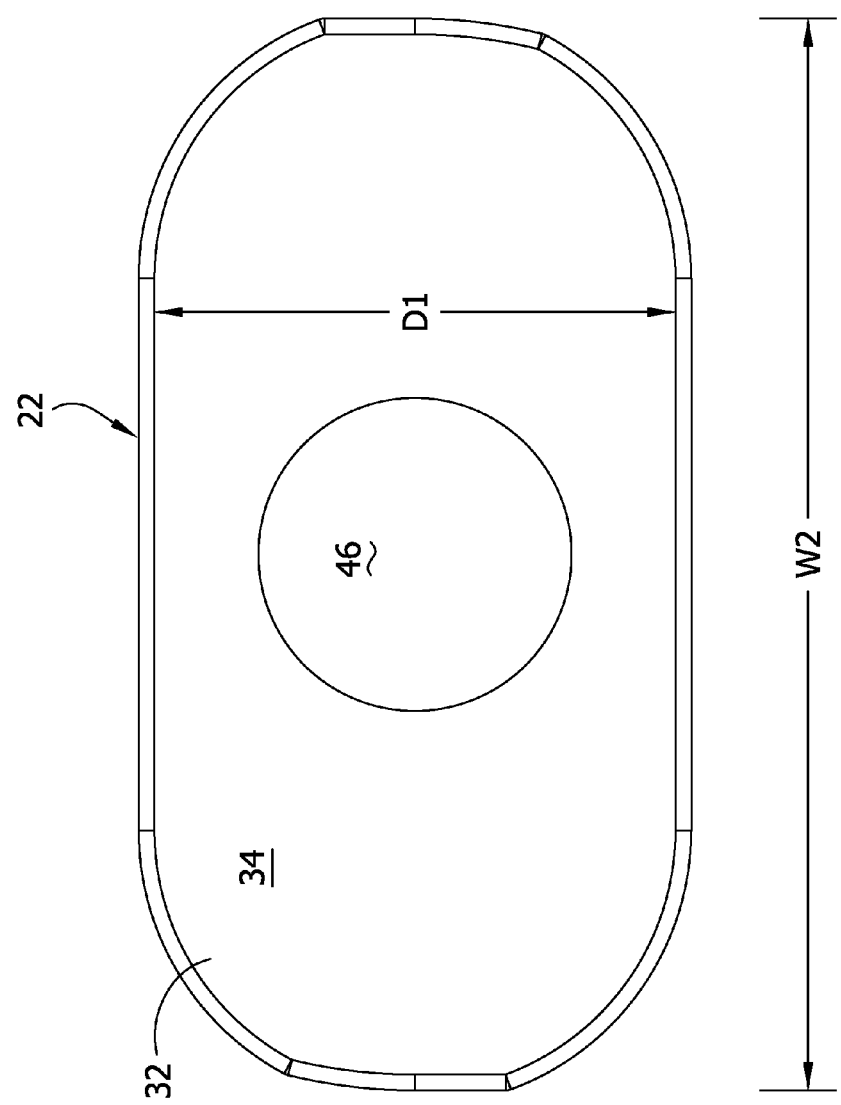
FIG. 8 is a top plan view of FIG. 7.
Figure 9:
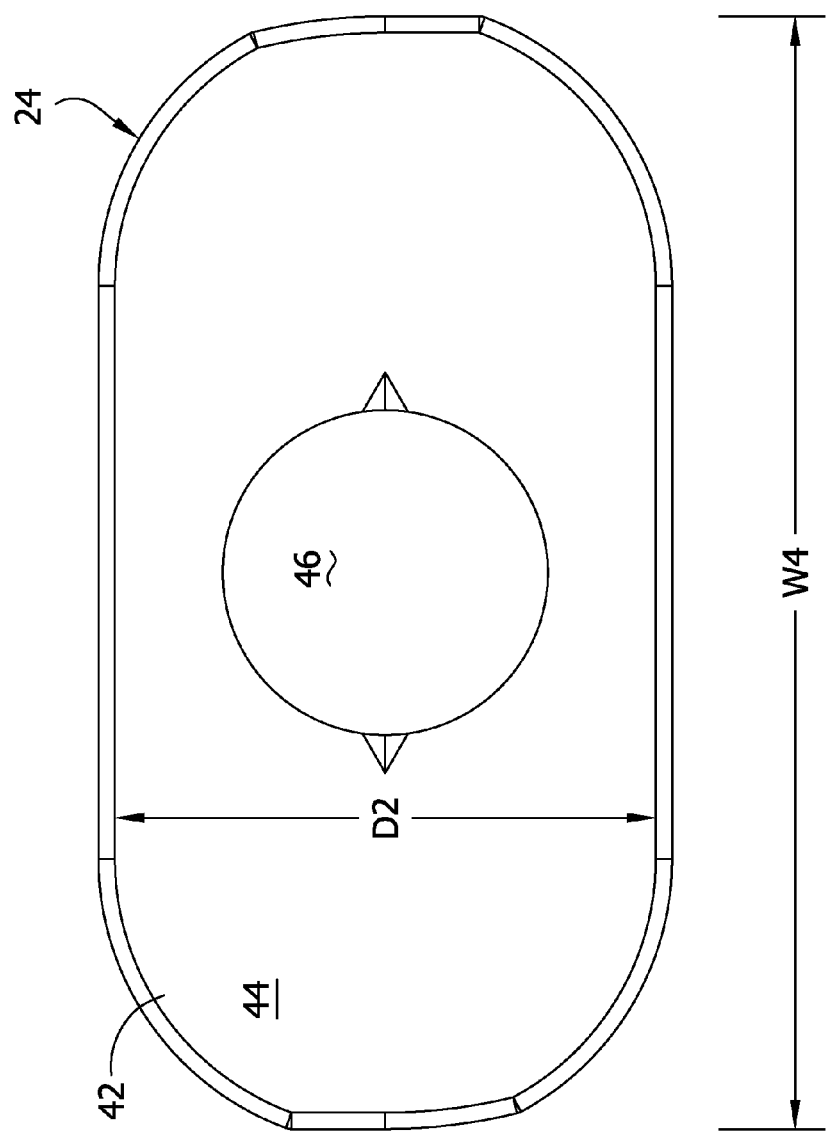
FIG. 9 is a bottom plan view of FIG. 7.
Figure 10:
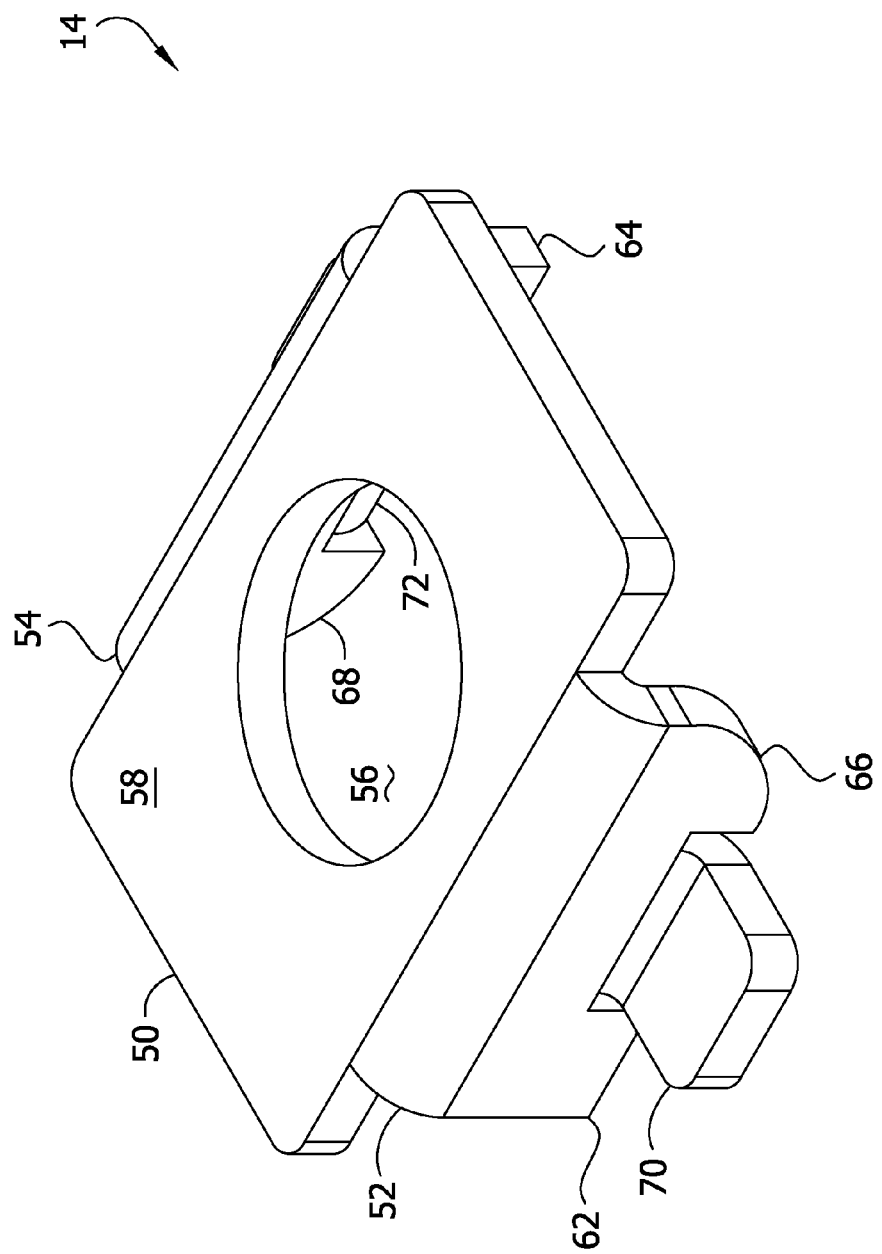
FIG. 10 is a perspective of the anti-rotation plate of the fitting.
Figure 11:
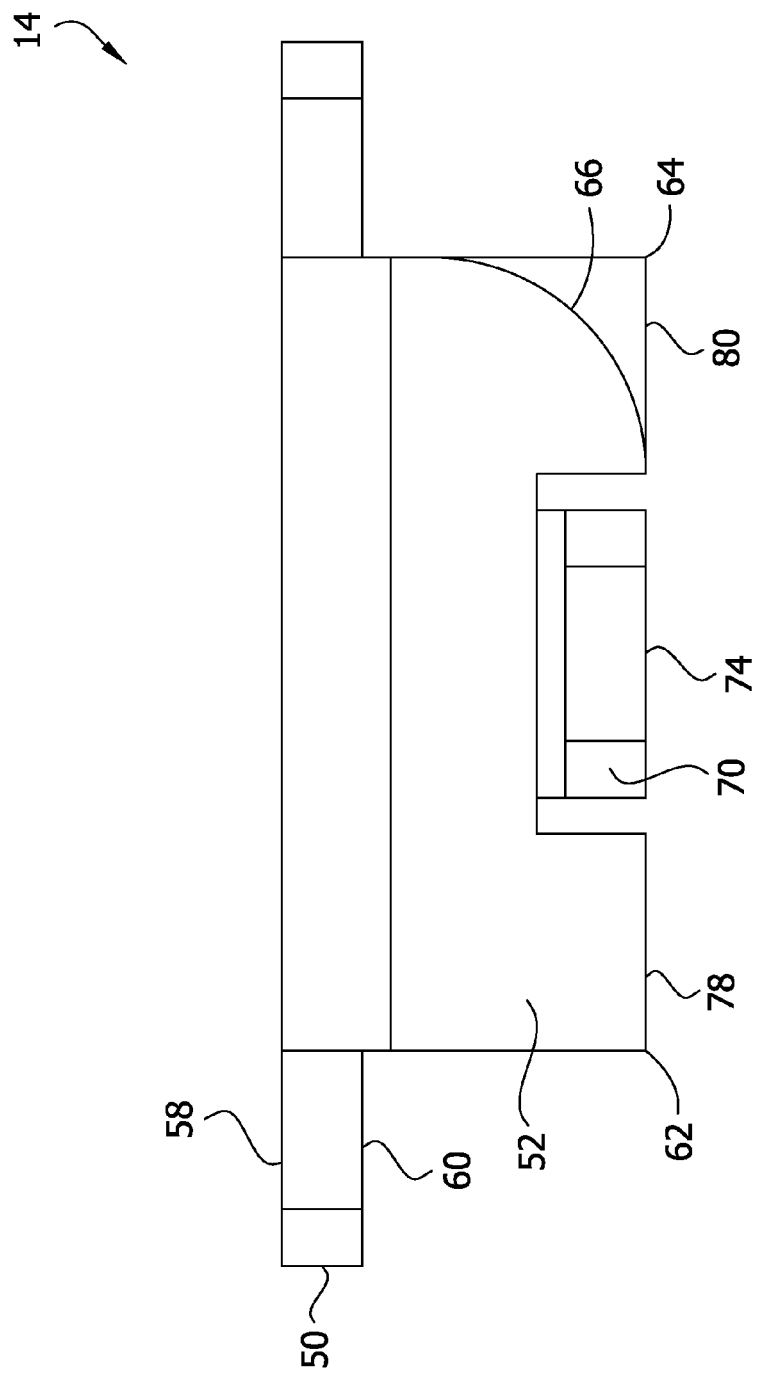
FIG. 11 is a right side elevation of FIG. 10.

Referring to FIGS. 1-9, the coupling component 12 includes a first coupling portion 22, a second coupling portion 24, and a transition portion 26 interposed between the first and second coupling portions. The first and second coupling portions 22, 24 are configured for attachment to a strut fitting attachment structure. In the illustrated embodiment, the first and second coupling portions 22, 24 are generally dovetail shaped. The first coupling portion 22 includes sides 28, 30 extending from the transition portion 26 to an upper surface 34 of the first coupling portion extending between and connecting the sides. The sides 28, 30 flare away from each other as they extend from the transition portion 26 to the upper surface 34 so that the first coupling portion has a generally dovetail cross-sectional shape. Referring to FIG. 7, a length L1 of the first coupling portion 22 adjacent the transition portion 26 is less than a length L2 of the first coupling portion at the upper surface 34. A width W1 (FIG. 8) of the first coupling portion 22 at the upper surface 34 is less than the length L2 of the first coupling portion at the upper surface.

Referring to FIG. 7, the second coupling portion 24 includes sides 38, 40 extending along the second coupling portion from the transition portion 26 to a lower surface 44 of the second coupling portion extending between and connecting the sides 38, 40. The sides 38, 40 flare away from each other as they extend from the transition portion 26 to the lower surface 44 of the second coupling portion 24 so that the second coupling portion has a generally dovetail cross-sectional shape. The bottom surface 44 of the second coupling portion 24 is generally parallel to the top surface 34 of the first coupling portion 22. A threaded opening 46 (see, e.g., FIG. 6) extends through the coupling component 12 from the top surface 34 to the bottom surface 44. A length L3 of the second coupling portion 24 at the transition portion 26 is less than a length L4 of the second coupling portion at the lower surface 44. A width W2 of the second coupling portion 24 at the lower surface 44 is less than the length L4 of the second coupling portion at the lower surface. The length L3 of the second coupling portion 24 is substantially equal to the length L1 of the first coupling portion 22, thereby defining a minimum length of the coupling component 12. Similarly, the length L4 is substantially equal to the length L2 (defining a maximum length of the coupling component 12), and the width W2 is substantially equal to the width W1 (defining a width of the coupling component). The first and second coupling portions 22, 24 are substantially mirror image dovetail couplings attached at the transition portion 26. Although the coupling component 12 is illustrated as a unitary structure, other configurations are within the scope of the present invention, such as the first and second coupling portions being separate pieces that are attached at the transition portion. The coupling component 12 may be of other configurations, including other shapes and dimensions, without departing from the scope of the present invention.

Referring to FIGS. 10-14, the anti-rotation plate 14 includes a base 50 and generally opposing first and second legs 52, 54 extending downward from opposite sides of the base. A through opening 56 extends completely through the base 50 from a top surface 58 to a bottom surface 60 of the base. A first corner 62, 64 at a free end of each leg 52, 54 may be generally squared, and a second corner 66, 68 at the free end of each leg may be rounded. The generally squared corner 62 of the first leg 52 generally opposes the rounded corner 68 of the second leg 54. Likewise, the squared corner 64 of the second leg 54 generally opposes the rounded corner 66 of the first leg 52. Each of the first and second legs 52, 54 includes a support tab 70, 72 extending laterally outward from the free end of the leg. The support tabs 70, 72 each include a bottom surface 74, 76 generally parallel to and aligned with a bottom edge 78, 80 of the respective leg 52, 54. The lock washer 18 is positioned adjacent the upper surface 58 of the base 50 of the anti-rotation plate 14, and the bolt 16 extends through the lock washer and through the opening 56 in the anti-rotation plate to threadedly engage the threaded opening 46 of the coupling component 12 (FIGS. 1-5). The bolt 16 includes a friction-enhancing coating disposed on at least a portion of the threads. This coating enhances friction between the bolt 16 and the coupling component 12 such that the coupling component rotates with the bolt (as opposed to relative to the bolt) when there is no counterforce opposing rotation of the coupling component or when a counterforce opposing rotation of the coupling component is less than a threshold force, as will be described in detail below. Examples of suitable friction-enhancing coatings include nylon patches and fastener adhesives, such as the 3M 2510/2510N fastener adhesive, the LOCTITE DRI-LOC 204 threadlocker, the BRADLEY 360° coverage nylon patch, or any other suitable coating. Other configurations for enhancing friction between the bolt and the coupling component are within the scope of the present invention, such as deforming some threads of the bolt.

Figure 2:
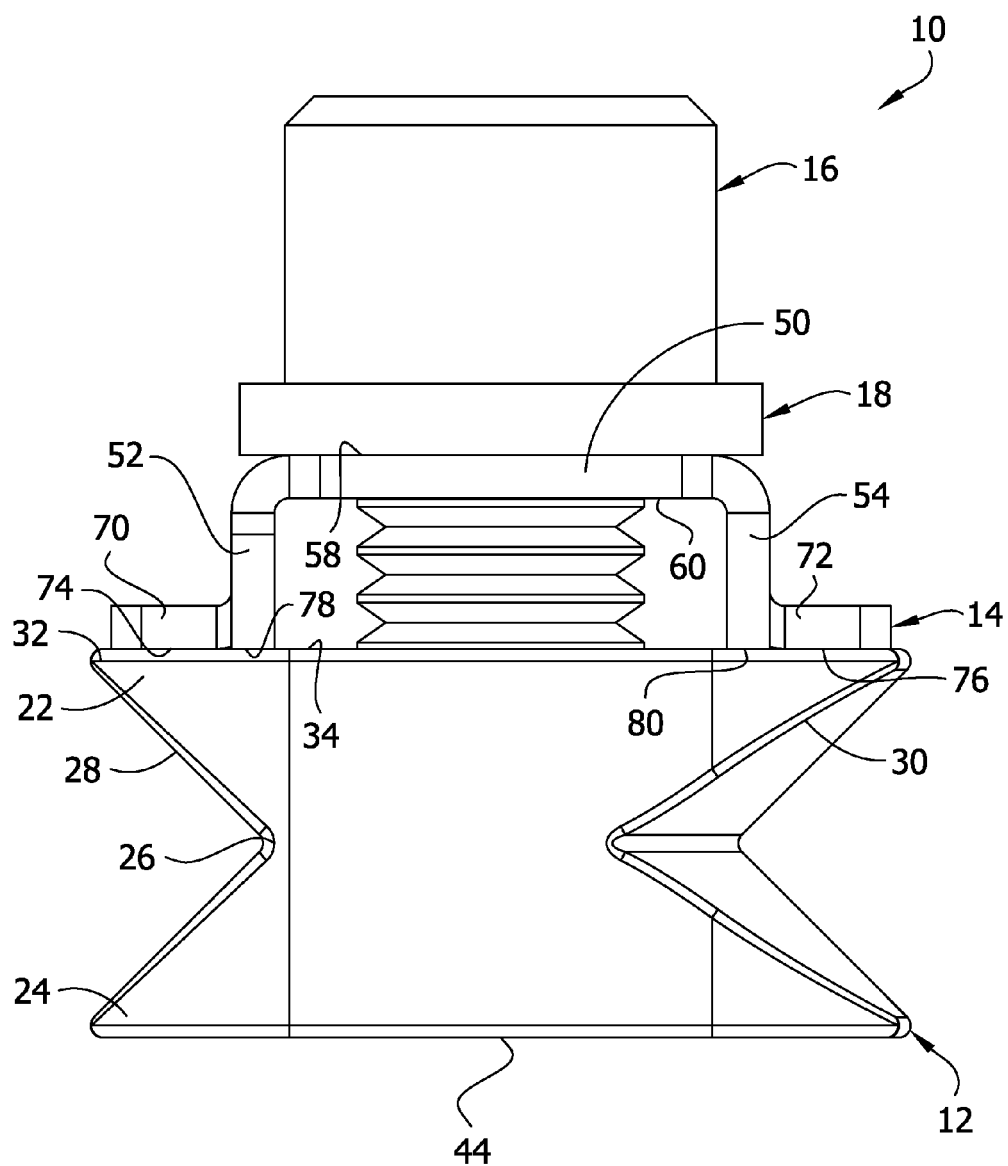
FIG. 2 is a front elevation of FIG. 1.
Figure 3:
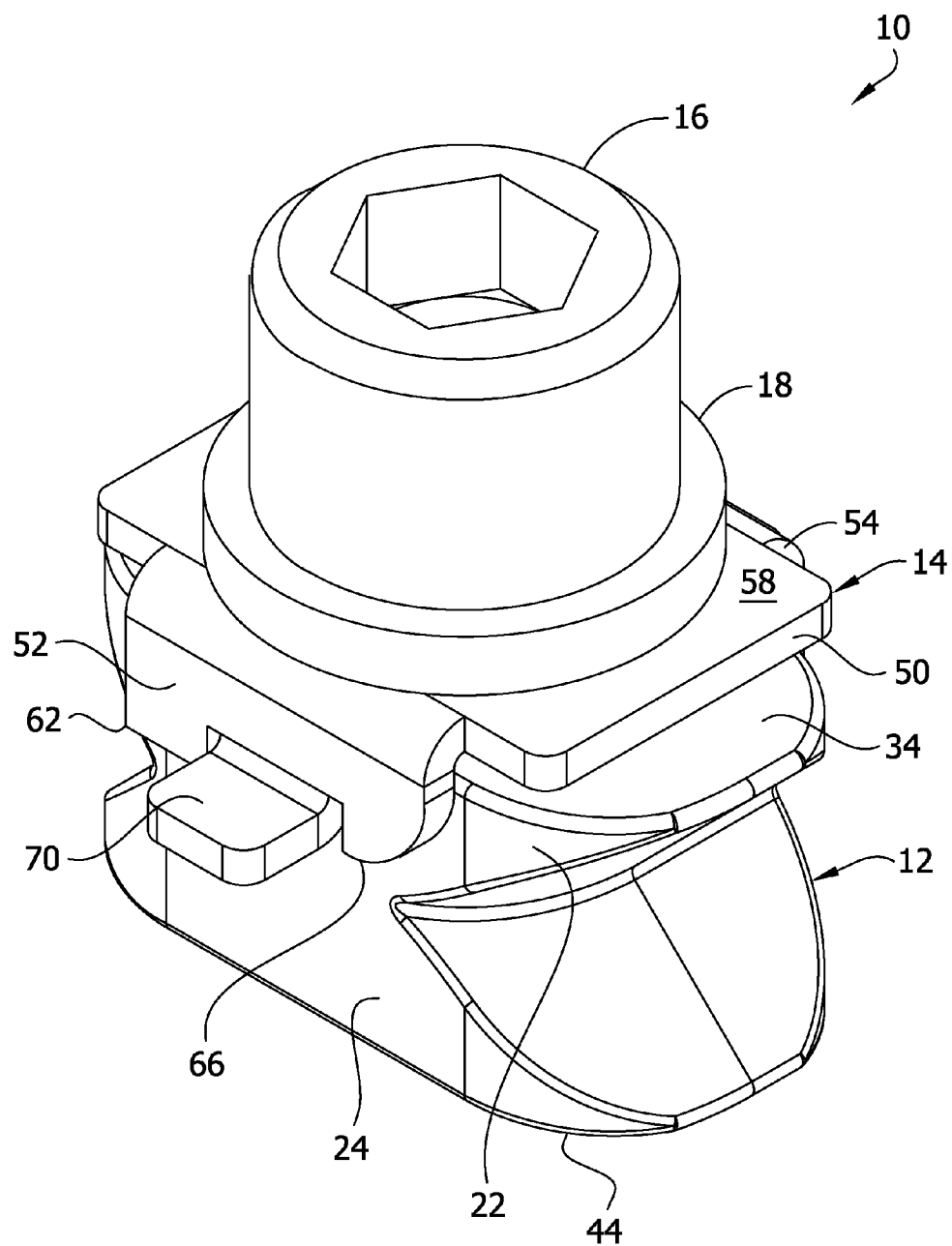
FIG. 3 is a perspective of the fitting, illustrating the anti-rotation plate in a second (locked) position.
Figure 4:
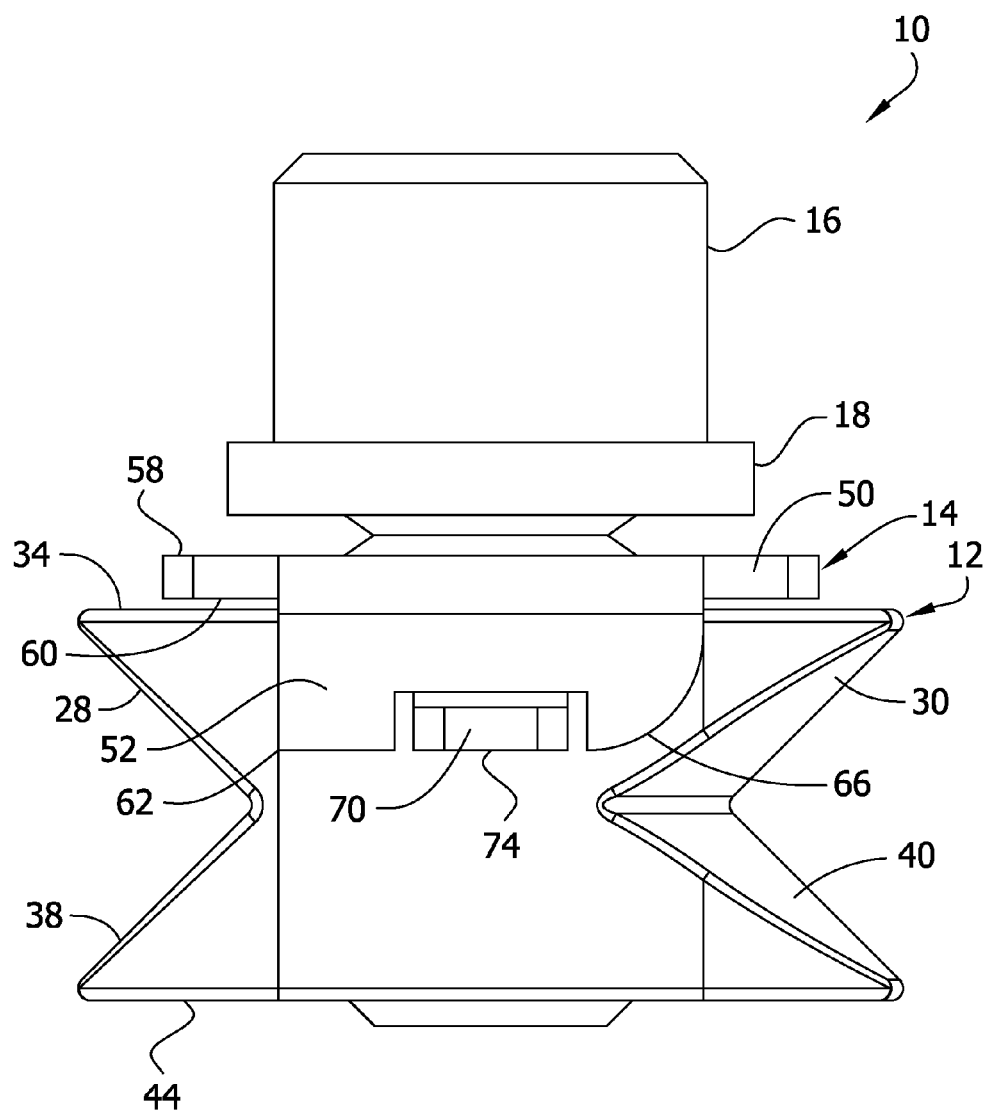
FIG. 4 is a front elevation of FIG. 3.
Figure 5:
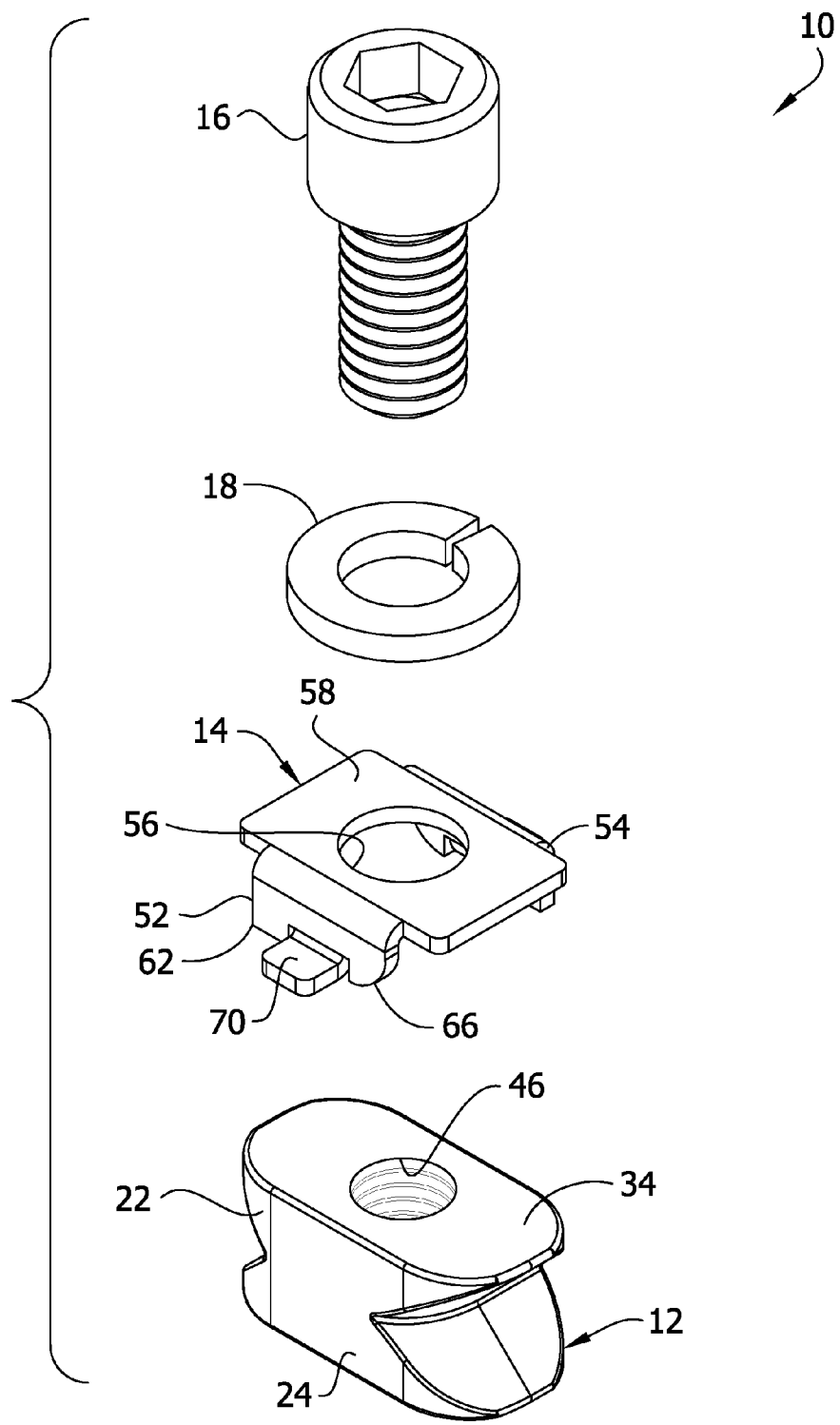
FIG. 5 is an exploded view of the fitting.
Figure 6:
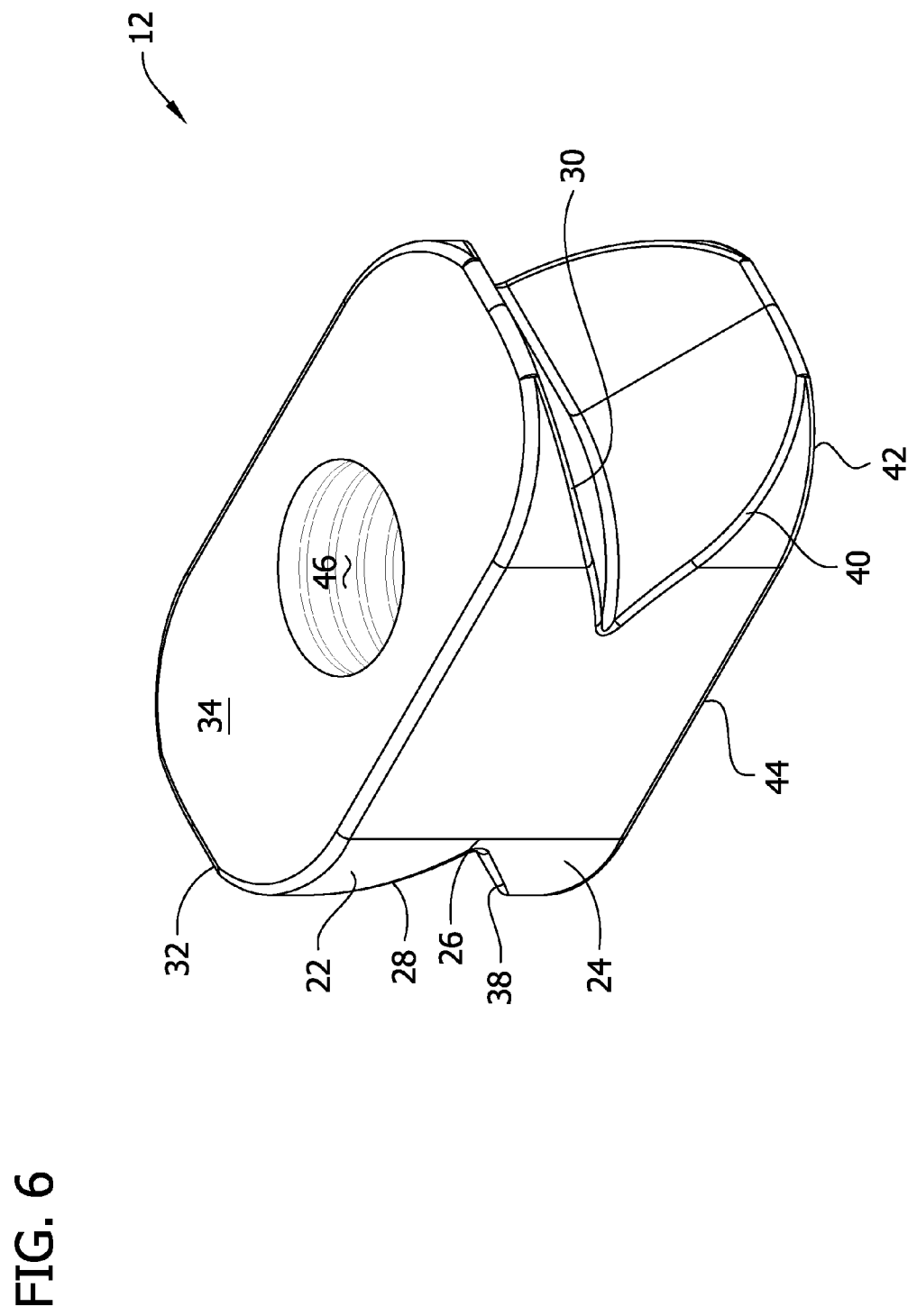
FIG. 6 is a perspective of a coupling component of the fitting.
Figure 12:
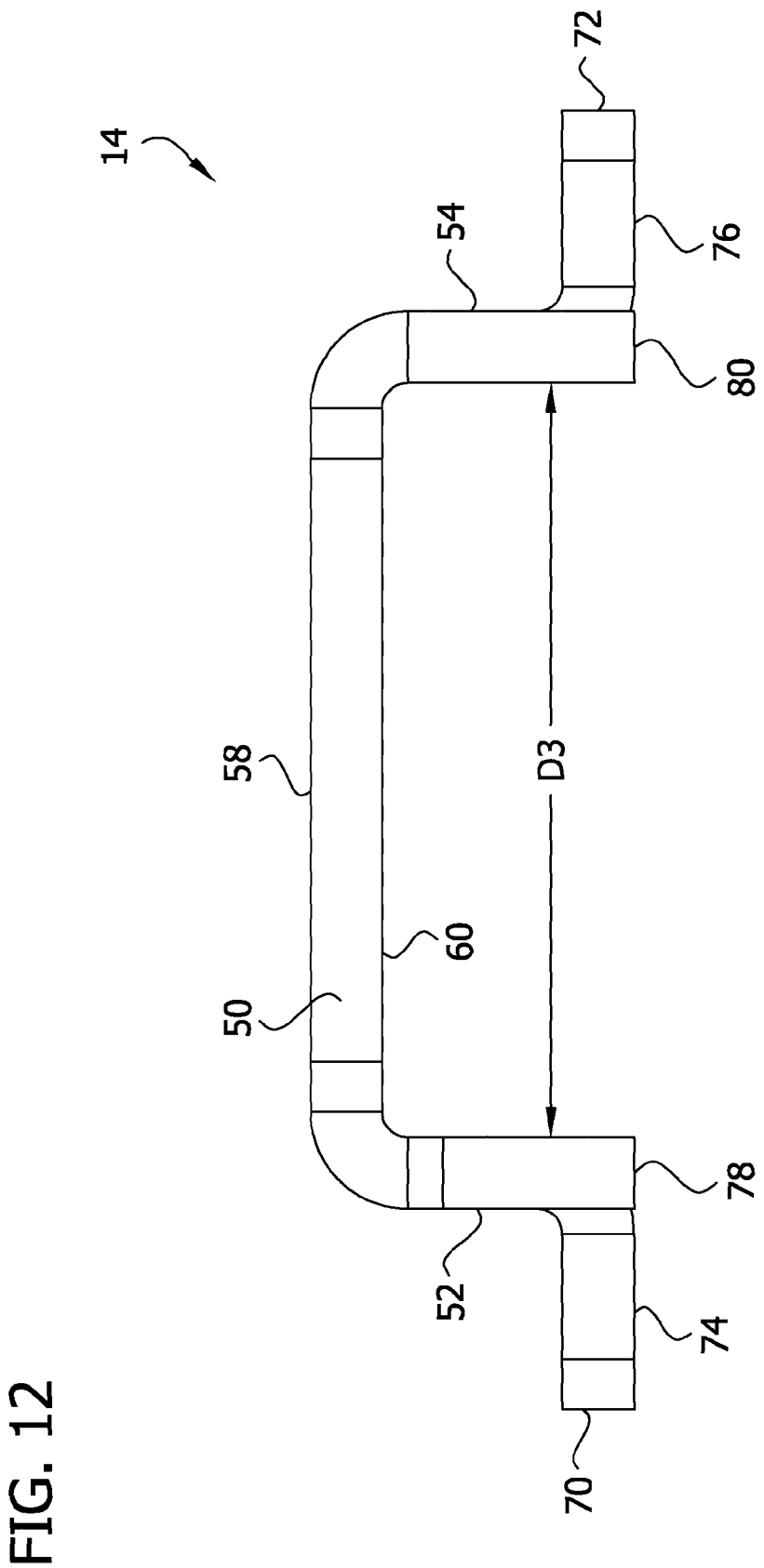
FIG. 12 is a front elevation of FIG. 10.
Figure 13:
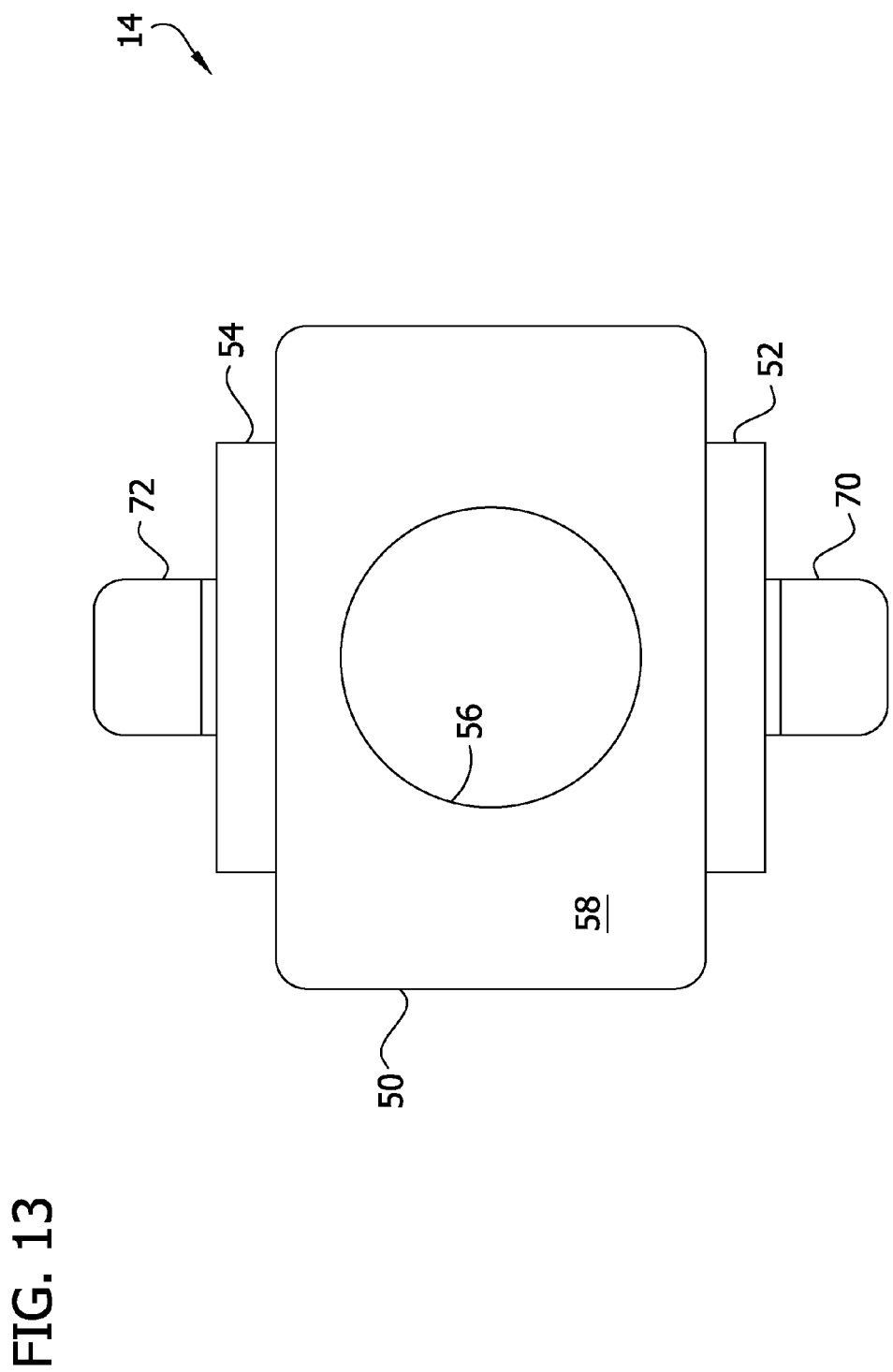
FIG. 13 is a top plan view of FIG. 10.
Figure 14:
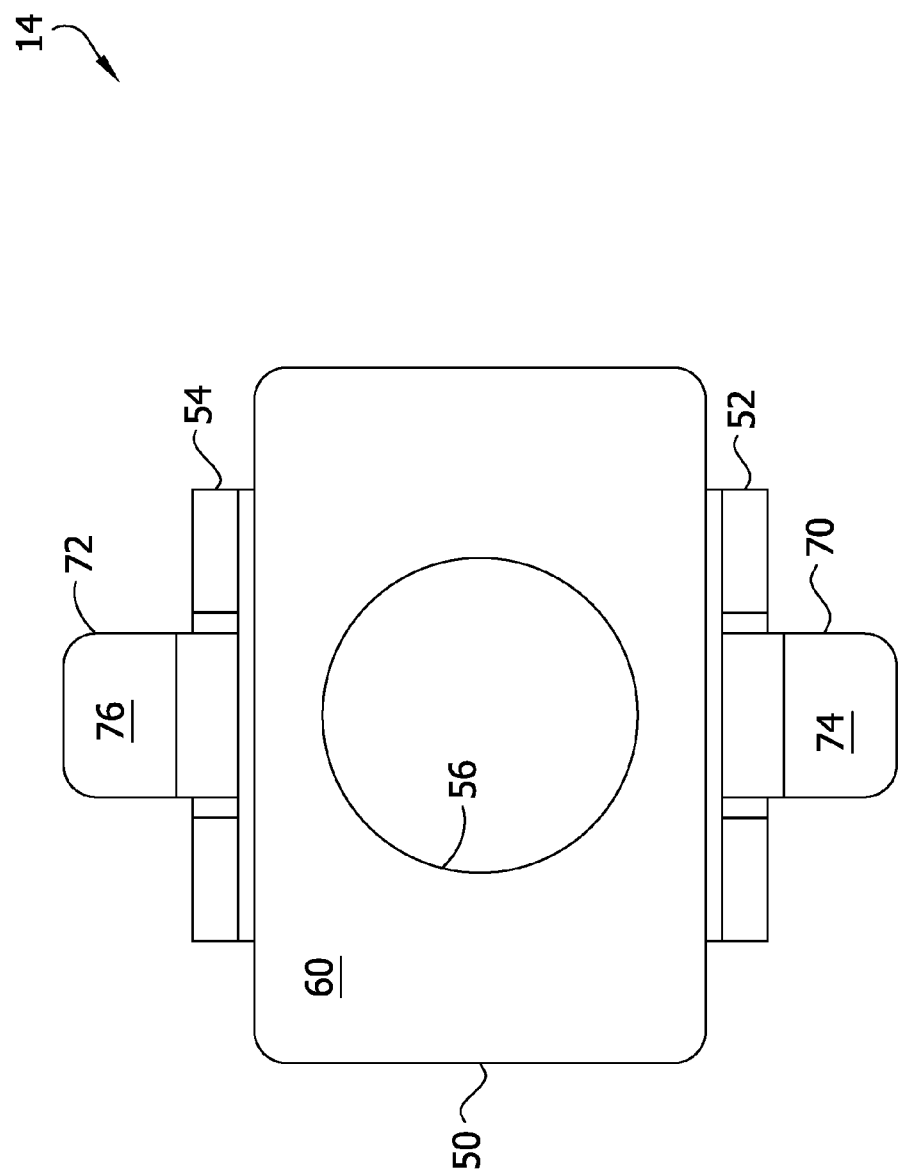
FIG. 14 is a bottom plan view of FIG. 10.

As shown in FIG. 12, a distance d1 between the first and second legs 52, 54 of the anti-rotation plate 14 is greater than at least the width W1 of the coupling component 12, and in the illustrated embodiment, is greater than both widths W1, W2. The distance d1 is less than at least the length L2 of the coupling component 12, and in the illustrated embodiment, is less than both lengths L2, L4. Thus, when the anti-rotation plate 14 is positioned on the first coupling portion 22 in a first or unlocked position or orientation, such that the distance d1 is generally parallel to the length L2 (see, e.g., FIGS. 1 and 2), the bottom surfaces 74, 76 of the support tabs 70, 72 and/or the bottom edges 78, 80 of the legs 52, 54 engage and rest upon the upper surface 34 of the first coupling portion. In this position, the bottom surface 60 of the base 50 is spaced from the upper surface 34 of the first coupling portion 22, as seen in FIG. 2. Moreover, as explained in more detail below, when the anti-rotation plate 14 is rotationally offset 90 degrees relative to the coupling component 12 (i.e., in a second or locked position relative to the coupling component), such that the distance d1 is generally parallel to the width W1 (see, e.g., FIGS. 3 and 4), the anti-rotation plate 14 moves downward along the bolt 16 such that the bottom surface 60 of the base 50 engages and rests upon the upper surface 34 of the first coupling portion 22 and at least a portion of the coupling component 12 (e.g., a portion of the first coupling portion) is received between the legs 52, 54.

Figure 22:
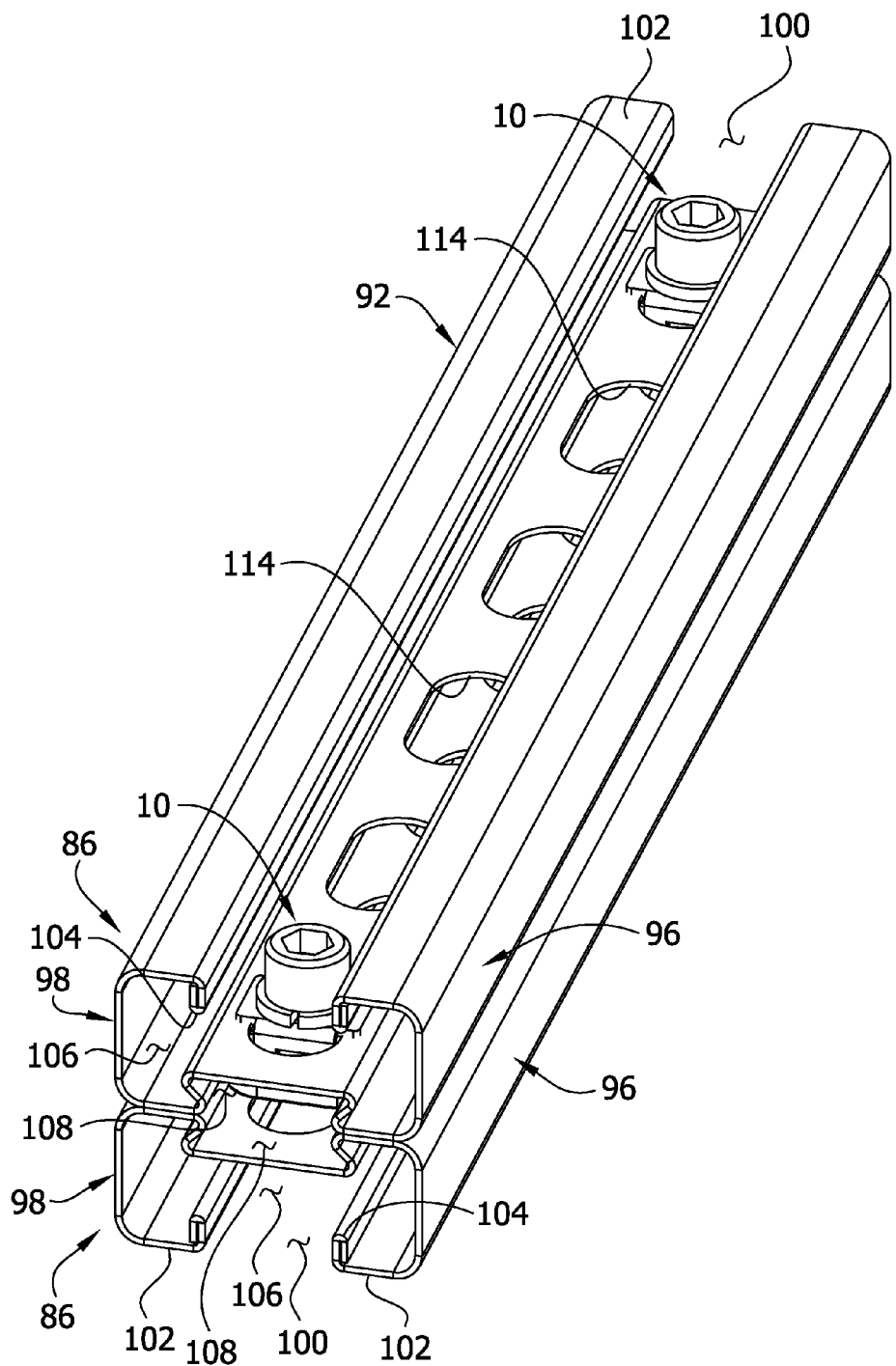
FIG. 22 is a perspective of fittings attaching two pieces of a second embodiment of strut.
Figure 23:
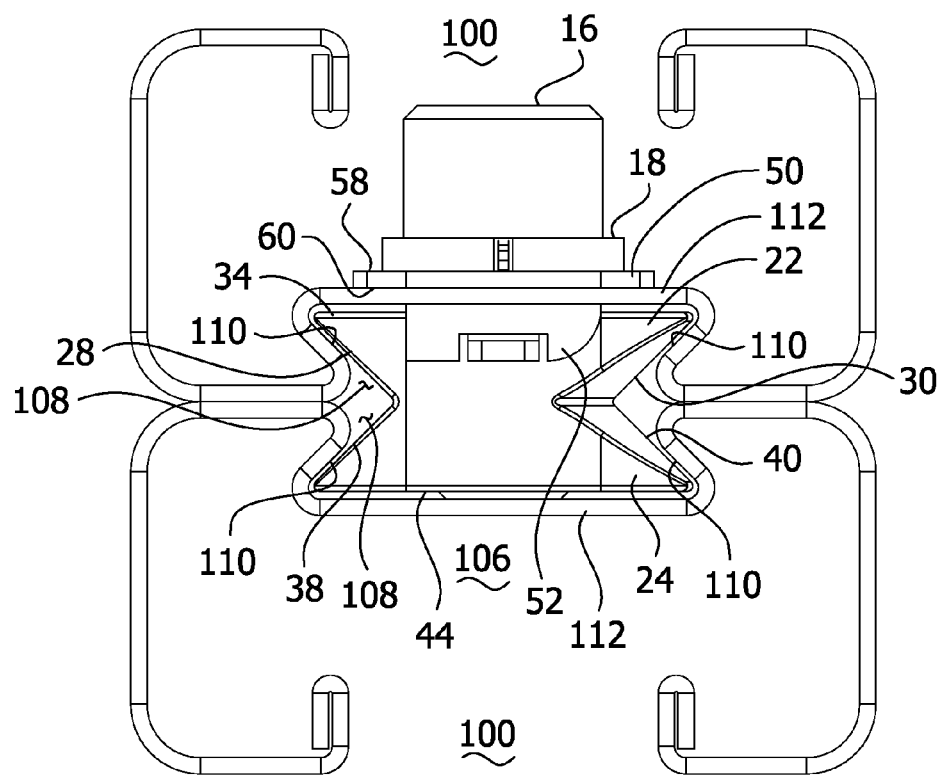
FIG. 23 is a side elevation of FIG. 22.

The illustrated embodiment of the fitting 10 is configured for attachment to illustrated strut 86. In general, referring to FIGS. 15-23, the strut 86 has an elongate body 88 extending along a longitudinal axis 90. The elongate body 88 has a generally square or rectangular cross-sectional shape having an upper side 92, a lower side 94, a right side 96, and a left side 98 (each indicated generally). The upper side 92 defines a continuous slot 100 (i.e., the upper side is open). The upper side 92 has outside surfaces 102 on either side of the slot 100, and inwardly (or downwardly) depending lips 104 leading to an open interior 106 of the strut 86. The strut 86 includes one or more fitting grooves 108 extending lengthwise of the body 88. For example, the strut can be strut as described in co-pending U.S. application Ser. No. 13/966,897 filed Aug. 14, 2013, the entirety of which is hereby incorporated by reference. Each of the lower, right, and left sides 94, 96, 98, respectively, can define a fitting groove 108 (see, e.g., FIGS. 15-21). Alternatively, at least the side (e.g., lower side 94) opposite the slotted side (e.g., upper side 92) defines a fitting groove 108, while the other two sides (e.g., the right and left sides 96, 98) may or may not define fitting grooves (see, e.g., FIGS. 22 and 23). Alternatively, the strut may include at least one fitting groove 108 and no continuous slot (i.e., the upper side is closed).

Figure 17:
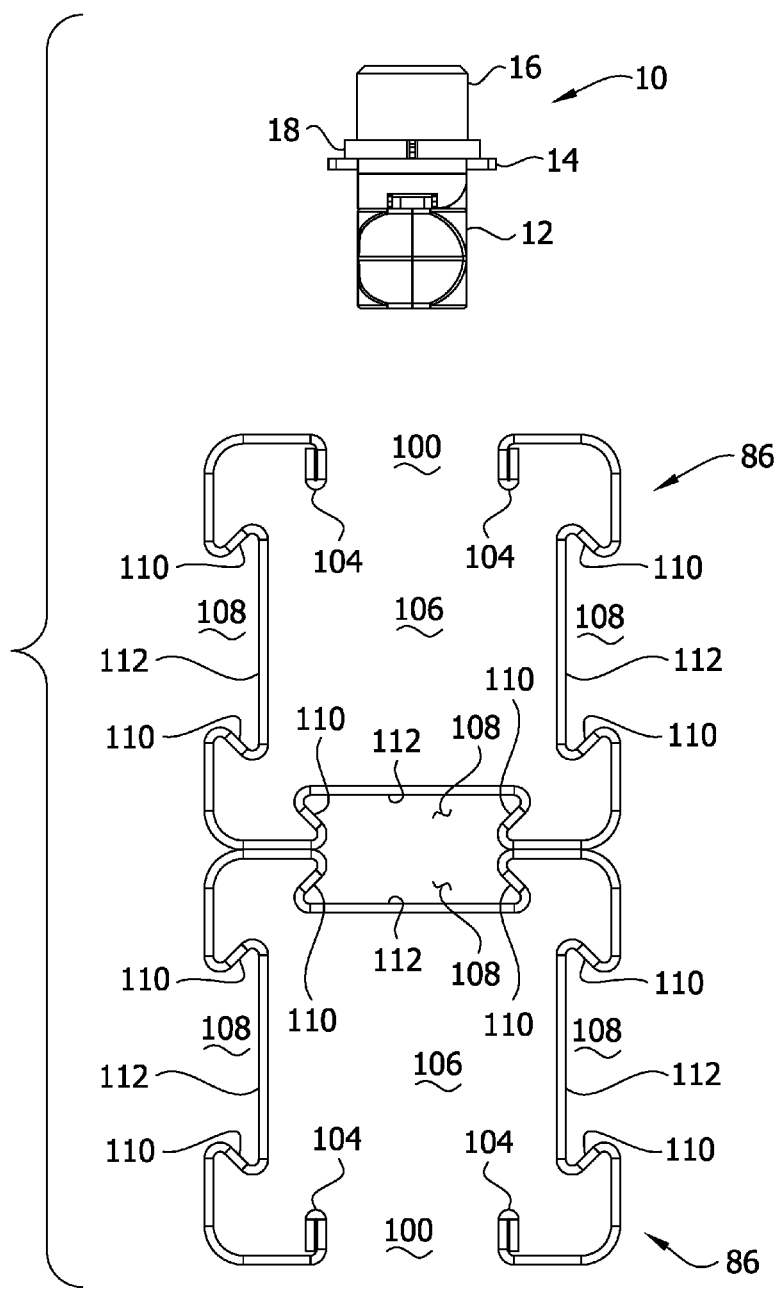
FIG. 17 is a front elevation of FIG. 15.

Each fitting groove 108 is defined by opposing side walls 110 extending inwardly from generally planar outer surfaces of the corresponding side 94, 96, 98 and toward the interior 106 of the body 88 (FIG. 17). The side walls 110 extend to a bottom wall 112 that spans between and interconnects the side walls. The side walls 110 flare away from one another as they extend inward from the outer surfaces toward the bottom 112 of the fitting groove 108 so that each fitting groove has a generally dovetail cross-sectional shape. Accordingly, each fitting groove 108 has a first relatively narrower width (e.g., a minimum width) at its entrance and a second relatively wider width (e.g., a maximum width) adjacent the bottom wall 112. In general, each fitting groove 108 has a dovetail cross-sectional shape, although each fitting may have other cross-sectional shapes. An opening (e.g., slot-shaped opening 114) extends through the bottom wall 112 from the open interior 106 to the fitting groove 108. As illustrated, the bottom wall 112 can include multiple slot-shaped openings 114 spaced along the length of the elongate body 88. In general, the fitting grooves 108 are configured for receiving a coupling component of a fitting for use in attaching or securing the fitting to any one of the sides 94, 96, 98 of the strut channel 86, such as the first or second coupling portions 22, 24 of the fitting 10. As explained in more detail below, the coupling component is configured to generally "lock" in the fitting groove to inhibit withdrawal of the fitting from the groove.

In one method, the fitting 10 can be used to connect two pieces of strut 86 to one another in a side-by-side configuration, as shown in FIGS. 15-23 (e.g., the lower side 94 of the first or top strut 86 is attached to the lower side 94 of the second or bottom strut 86). It is understood that the fitting 10 can be used to secure any one of the sides 94, 96, 98 of a first strut 86 to any one of the sides 94, 96, 98 of another strut. Moreover, more than two pieces of strut 86 can be secured together using additional fittings 10.

Figure 15:
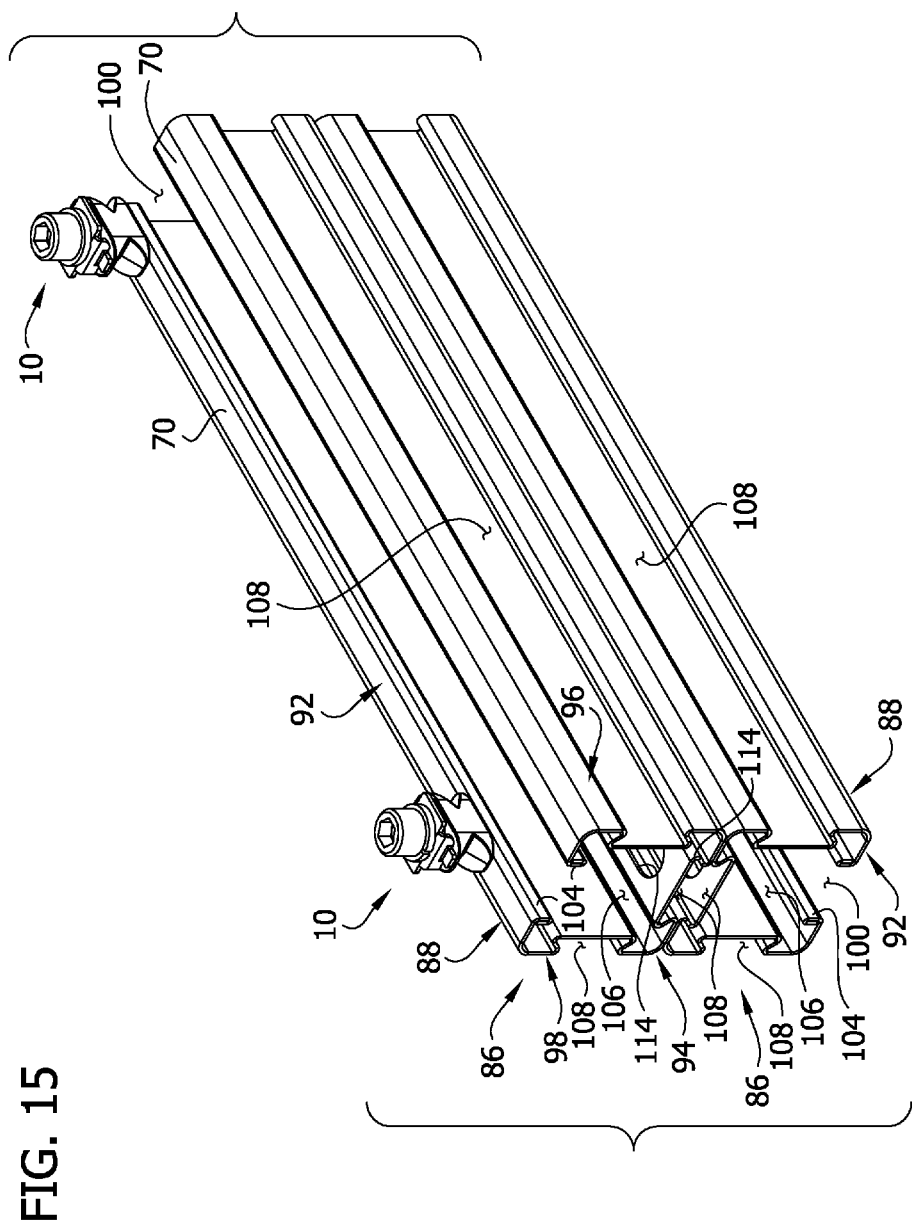
FIG. 15 is a perspective of two fittings each in the first (unlocked) orientation and positioned to be inserted into a first embodiment of strut to connect two pieces of strut together.
Figure 16:
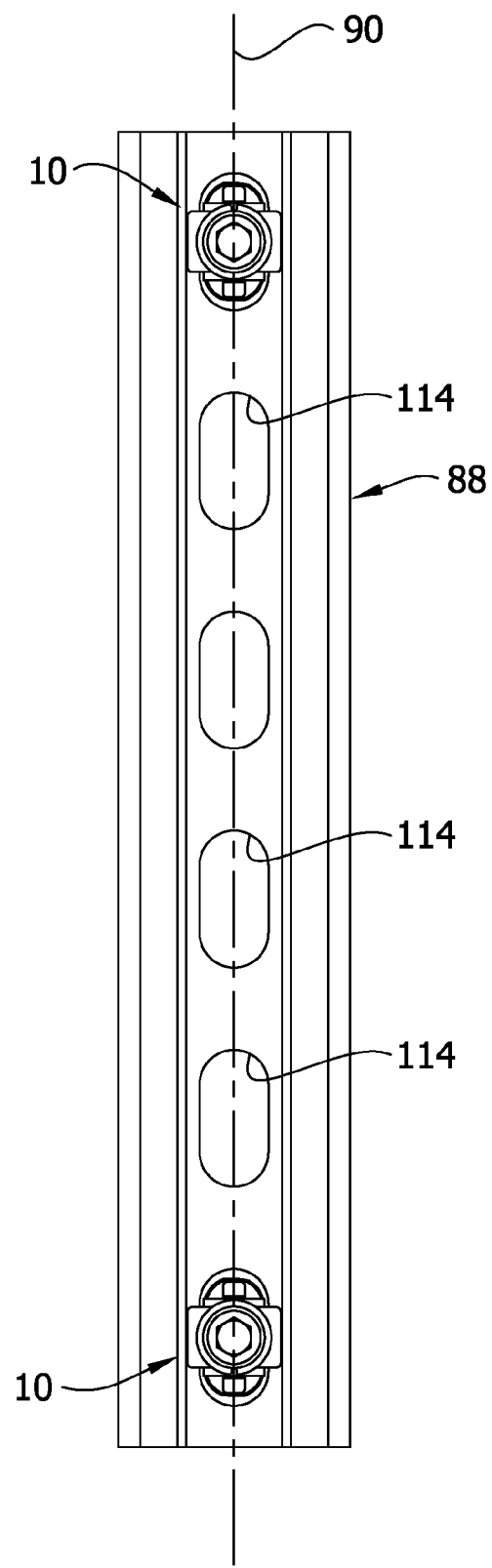
FIG. 16 is a top plan view of FIG. 15.
Figure 18:
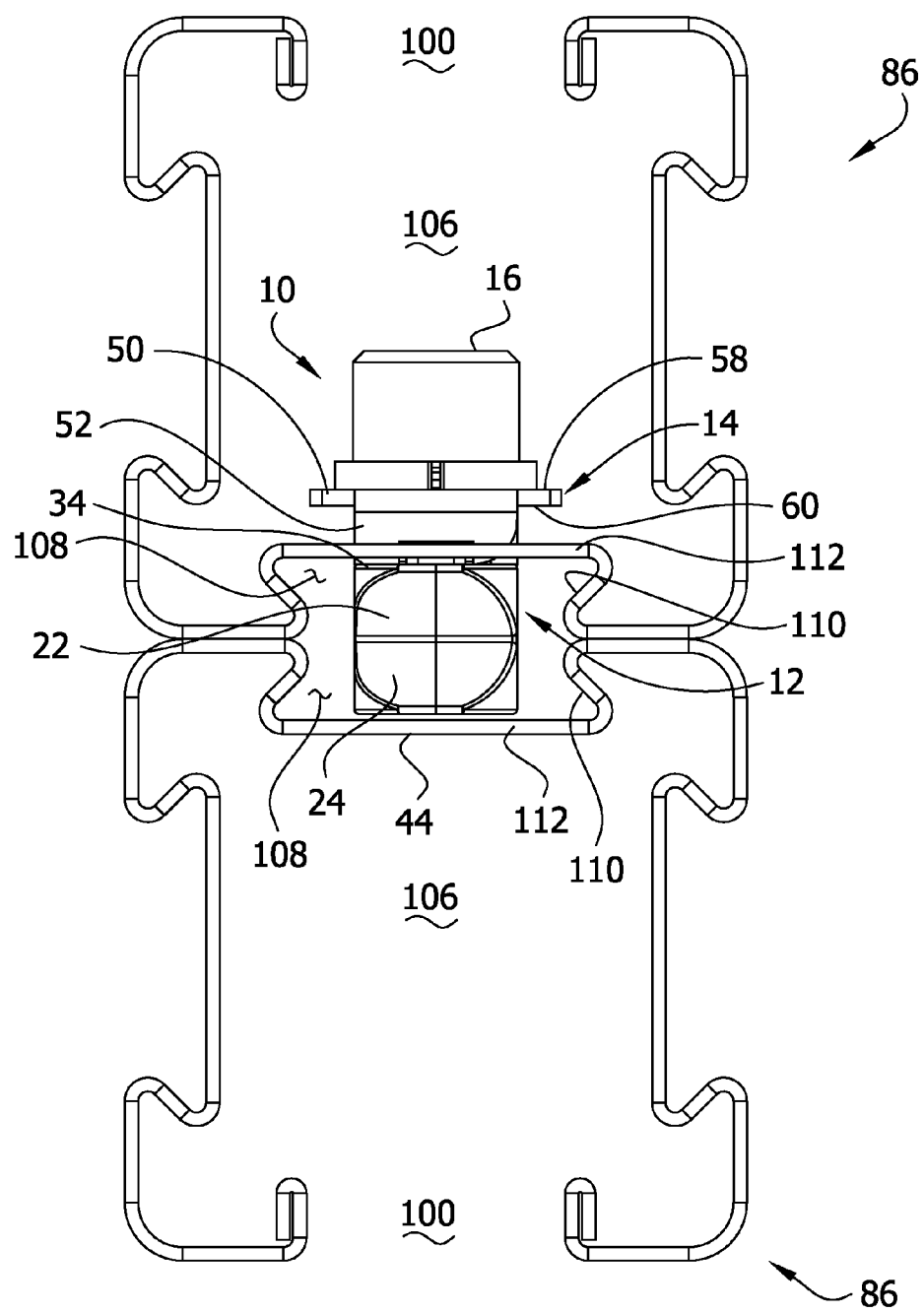
FIG. 18 is a front elevation of the fittings inserted in the new strut in the first (unlocked) orientation.
Figure 19:
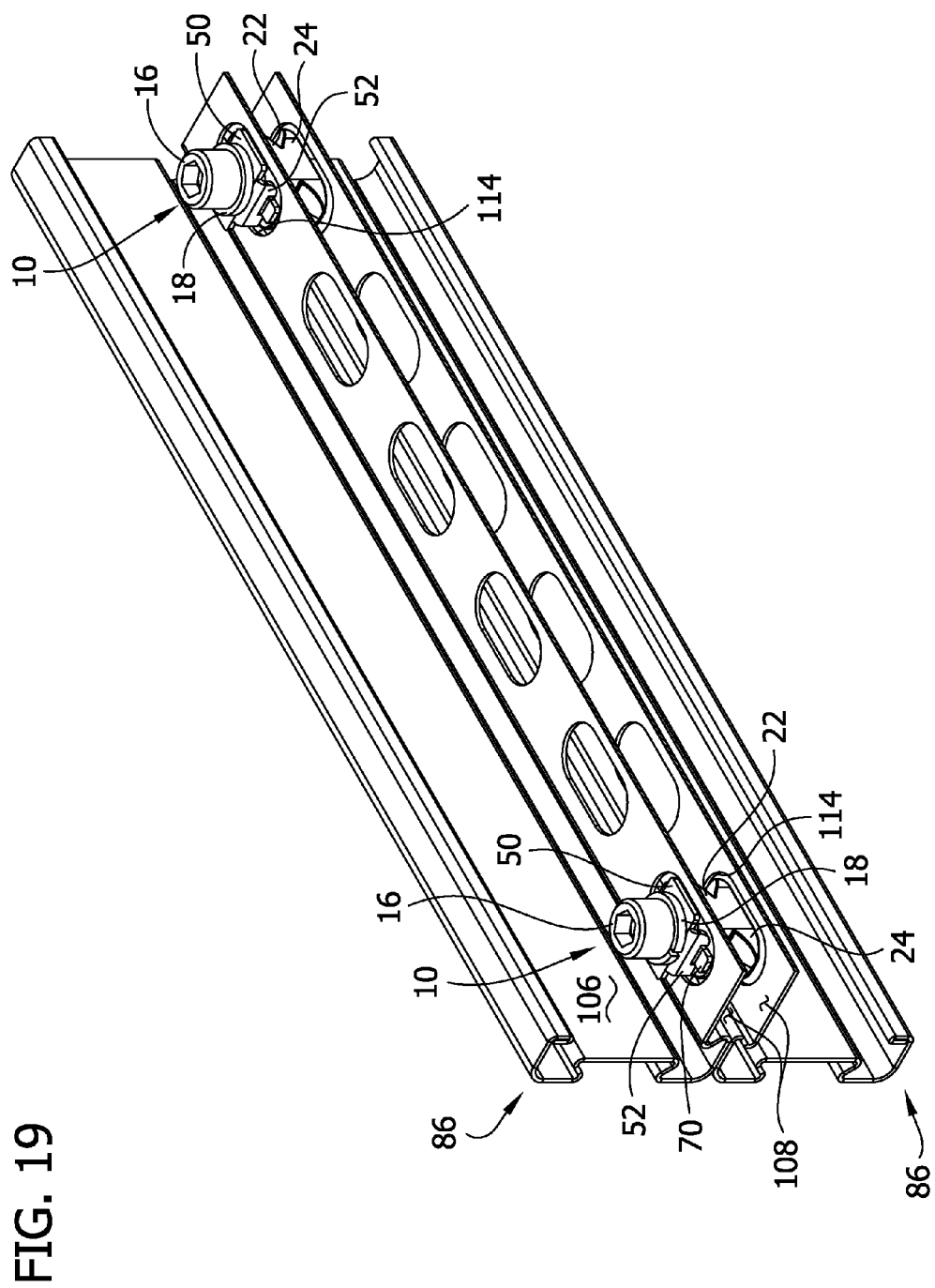
FIG. 19 is a perspective of the two pieces of strut with the fittings inserted in the first orientation, portions of the two pieces of strut being removed to show the coupling components of the respective fittings.
Figure 20:
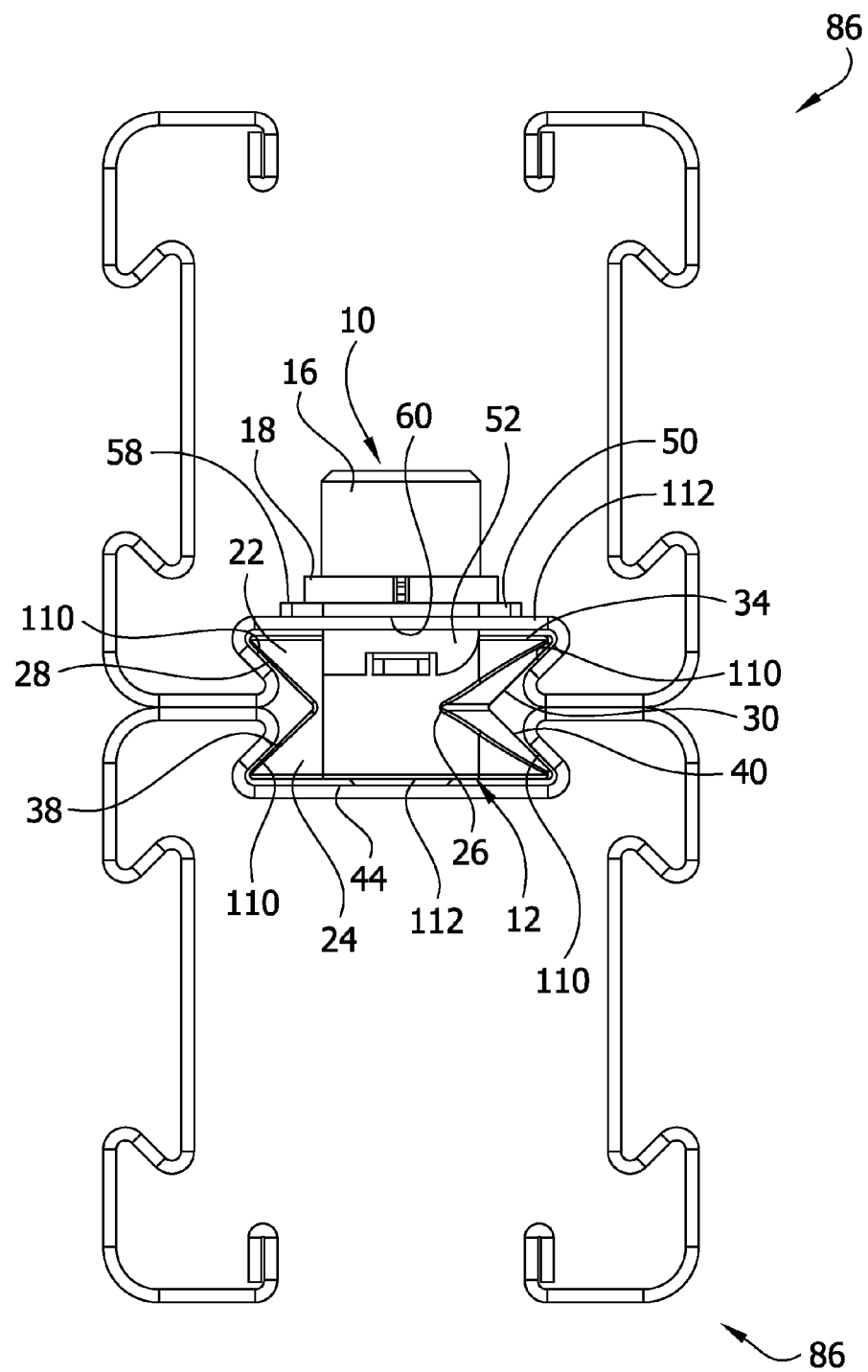
FIG. 20 is a side elevation of the pieces of strut including the fittings orientated in the second (locked) orientation and connecting the two pieces of strut together.
Figure 21:
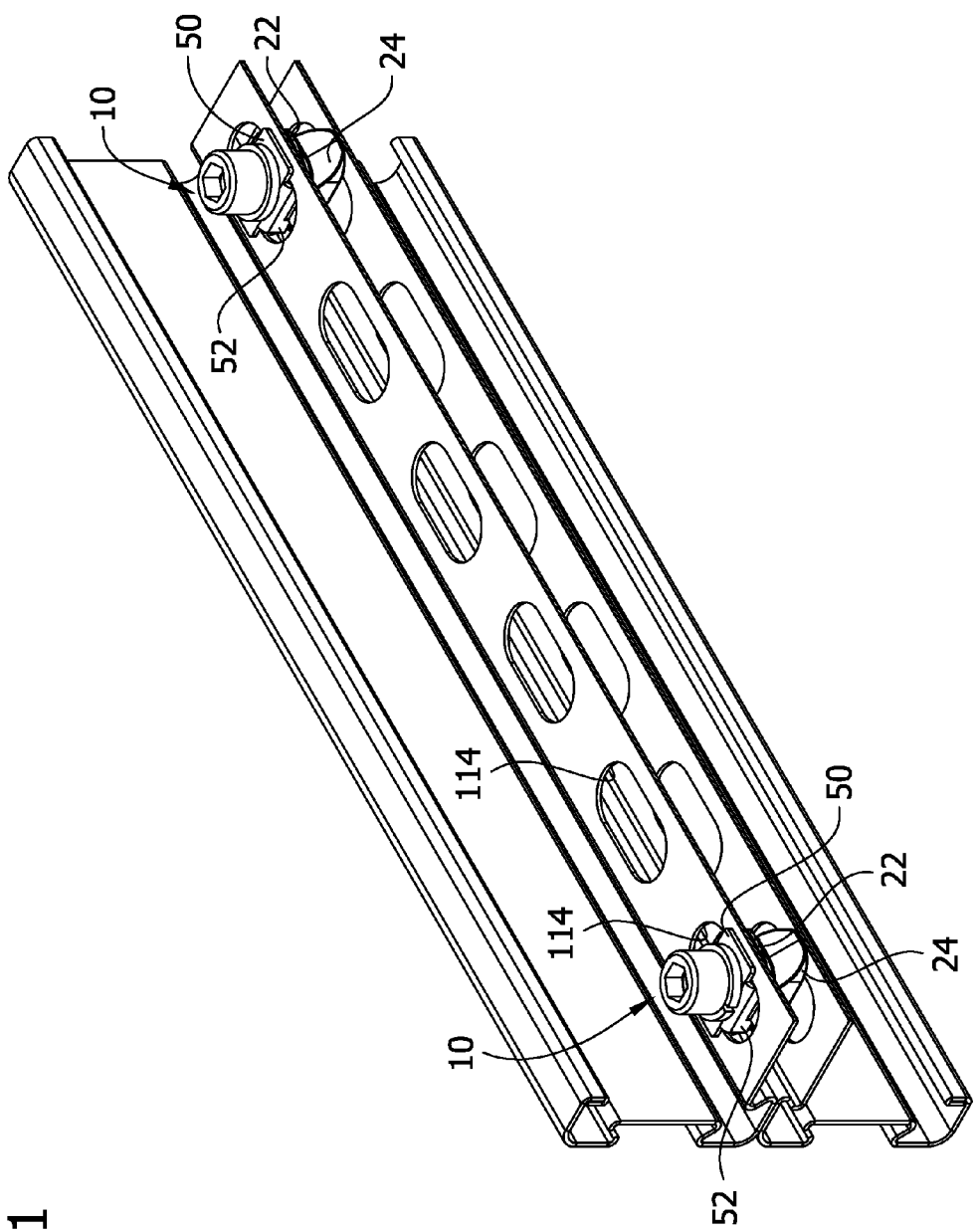
FIG. 21 is similar to FIG. 19, but with each fitting in the second (locked) orientation.

In one exemplary method, two pieces of strut 86 are brought together such that the fitting grooves 108 of the sides to be attached (e.g., lower sides 94) are in opposed facing relationship (see FIGS. 15-17). The fitting 10 is inserted into the interior 106 of a first one of the strut 86, such as by inserting the fitting through the continuous slot 100 defined in the upper side 92. The fitting 10 is then inserted in one of the fitting grooves 108 through one of the slot-shaped openings 114 extending through the bottom wall 112 of the corresponding fitting groove (FIGS. 18 and 19). The fitting 10 is inserted into the fitting groove 108 in an initial or first orientation, in which the length L2 of the first coupling portion 22 extends generally parallel to the longitudinal axis 90 of the body 88. The support tabs 70, 72 ensure the fitting 10 is inserted through the slot-shaped opening 114 and into the fitting groove 108 in the correct orientation. The anti-rotation plate 14 is positioned on the coupling component 12 in its unlocked position such that the bottom surface 60 of the base 50 is spaced from the top surface 34 of the first coupling portion 22, the support tabs 70, 72 and/or the bottom edges 78, 80 of the legs 52, 54 engage and rest upon the top surface 34 of the first coupling portion 22, and the distance d1 between the legs extends generally parallel to both the longitudinal axis 90 of the body 88 and the length L2. When the coupling component 12 is inserted through the slot-shaped opening 114 and into the fitting groove 108 of the first strut 86, the first coupling portion 22 will be received in the fitting groove of the first strut and the second coupling portion 24 will extend out of the fitting groove of the first strut and into the fitting groove 108 of the second strut 86. Alternatively, the first and second pieces of strut 86 may not be aligned initially. Instead, the second strut 86 can be brought into side-by-side arrangement with the first strut 86 after the coupling component 12 is inserted in the fitting groove 108 of the first strut, whereupon the second coupling portion 24 enters the fitting groove 108 of the second strut.

With the first and second pieces of strut 86 in a side-by-side arrangement and the fitting 10 in its unlocked orientation and received in both fitting grooves 108, the bolt is rotated about its axis, such as by using a suitable tool, to impart rotation to the coupling component 12 relative to the anti-rotation plate 14. The coupling component 12 is rotated about 90 degrees (e.g., a quarter turn) such that the lengths L2, L4 of the respective coupling portions 22, 24 extend generally transverse to the lengths of the respective fitting grooves 108. The bolt 16 imparts rotation to the coupling component 12 due to the friction-enhancing coating on the thread. The squared corners 62, 64 of the respective legs 52, 54 engage sides of the slot-shaped opening 114 to inhibit further rotation of the coupling component 12 beyond about 90 degrees relative to the anti-rotation plate 14. Continued rotation of the bolt 16 does not impart rotation to the coupling component 12 because the counterforce imparted by the engagements of the squared corners 62, 64 of the respective legs 52, 54 with the sides of the slot-shaped opening 114 overcomes the frictional force between the friction-enhancing coating and the threaded opening in the coupling component. The anti-rotation plate 14 will not rotate with the bolt 16, and will remain in the initial orientation with the distance d1 between the legs 52, 54 extending generally parallel to the longitudinal axis 90 of the body 88. Rotating the coupling component 12 causes the anti-rotation plate 14 to be in the locked position relative to the coupling component. Thus, after the coupling component 12 is rotated, the distance d1 will be generally parallel to the width W1 of the first coupling portion 22, thereby permitting the anti-rotation plate 14 to move downward along the bolt 16 relative to the coupling component. The anti-rotation plate 14 will drop into the slot-shaped opening 114 until the base 50 (specifically, the bottom surface 60 of the base) engages and rests upon the bottom wall 112 (i.e., a majority of each of the legs 52, 54 will extend downward through the slot-shaped opening and into the fitting groove 108, see FIGS. 20 and 21).

When the fitting 10 is locked into place in the fitting grooves 108, the first coupling portion 22 is aligned with and engages the dovetail fitting groove 108 of the first strut 86, and the second coupling portion 24 is aligned with and engages the dovetail fitting groove 108 of the second strut 86. Specifically, the sides 28, 30 and top 34 of the first coupling portion 22 engage the side walls 110 and bottom wall 112, respectively, of the fitting groove 108 of the first strut 86. Likewise, the sides 38, 40 and bottom 44 of the second coupling portion 24 engage the side walls 110 and bottom wall 112, respectively, of the fitting groove 108 of the second strut 86. Once the fitting 10 is locked in place in the fitting grooves 108, the bolt 16 can be tightened to clamp the bottom wall 112 between the anti-rotation plate 14 and the coupling component 12. The coupling component 12 will not rotate any further with the bolt 16 (i.e., the bolt will move relative to the coupling component) because of the engagement of the first and second coupling portions 22, 24 with the dovetail fitting grooves 108. In addition, the anti-rotation plate 14 inhibits rotation of the fitting 10. Specifically, the legs 52, 54 will contact the edges of the slot-shaped opening 114 when the fitting is rotated, thereby inhibiting rotation of the coupling component 12 from its second orientation to its first orientation. As a result, the first and second coupling portions 22, 24 are inhibited from rotating relative to the respective fitting grooves 108 to inhibit the coupling portions from inadvertently disengaging from the respective strut 86.

Once the fitting 10 is locked in place in the fitting grooves 108, it may be difficult to remove the fitting to disconnect the pieces of strut 86. However, the rounded corners 66, 68 of the legs 52, 54 permit the anti-rotation plate 14 to be rotated (with some degree of difficulty) in one direction to facilitate removal of the fitting 10 from the slot-shaped opening 114. Thus, although the anti-rotation plate 14 inhibits rotation of the fitting 10, it is also structured and configured to ease rotation in one direction to facilitate removal of the fitting 10 (after the bolt 16 is appropriately loosened).

As described above, the fitting 10 is configured for engagement with and interconnection of two pieces of strut 86 having fitting grooves 108. The fitting 10 includes an anti-rotation plate 14 to inhibit rotation and removal of the fitting from the strut, thereby inhibiting disconnection of the strut. The fitting permits a user to simply, efficiently, and cheaply attach pieces of strut to each other. Workers can easily drop the fitting into strut and rotate it to attach strut together.

As seen in FIGS. 15, 16, 19, 21, and 22, multiple fittings 10 can be attached to strut 86 to interconnect two pieces of strut along their length. In addition, multiple fittings 10 can be used to attach multiple pieces of strut 86. For example, in the embodiment illustrated in FIG. 18, additional fittings 10 can be used to attach additional pieces of strut 86 to the other sides of the first and/or second strut (not shown).

In one embodiment, a system for attaching pieces of strut can be sold and shipped to a customer. The system includes strut 86 (such as any of the strut types shown and described above) and at least one fitting 10. In one embodiment, the system includes multiple fittings 10. In another embodiment, the system includes multiple pieces of strut 86. Workers at a job site have the flexibility to attach pieces of strut to each other in any configuration according to the needs at the job site.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, the fitting comprising:
   a coupling component having first and second coupling portions configured for reception in respective fitting grooves of the first and second pieces of strut when the coupling component is in a first orientation relative to the respective fitting grooves, wherein each of the first and second coupling portions are rotatable within the respective fitting grooves from the first orientation to a second orientation to connect the first and second pieces of strut to one another such that the fitting sides of the first and second pieces of strut are juxtaposed and face one another; and
   an anti-rotation plate connected to the coupling component, wherein the anti-rotation plate has an unlocked position relative to the coupling component to allow the first and second coupling portions to be received in the respective fitting grooves, and a locked position relative to the coupling component to inhibit rotation of each of the first and second coupling portions from the second orientation to the first orientation,
   wherein the anti-rotation plate comprises a base and generally opposing first and second legs extending downward from opposite sides of the base,
   wherein the first coupling portion has a length extending between longitudinal ends and a width extending between sides, the length being greater than a distance between the first and second legs of the anti-rotation plate and the width being less than the distance between the first and second legs.

2. The fitting as recited in claim 1, wherein when the anti-rotation plate is in the unlocked position, the first and second legs are positioned above the coupling component and extend along the length of the first coupling portion, and when the anti-rotation plate is in the locked position, the first and second legs extend downward along the sides of the first coupling portion and along the width of the first coupling portion.

3. The fitting as recited in claim 2, wherein each of the first and second legs comprises a support tab extending outward from the leg, the support tab being configured to engage the coupling component when the anti-rotation plate is in the unlocked position.

4. The fitting as recited in claim 1, wherein each of the first and second legs includes a first squared corner and a second rounded corner.

5. The fitting as recited in claim 4, wherein the first squared corner of the first leg is in opposing relation to the second rounded corner of the second leg and the first squared corner of the second leg is in opposing relation to the second rounded corner of the first leg.

6. The fitting as recited in claim 1, further comprising a fastener connecting the coupling component and the anti-rotation plate.

7. The fitting as recited in claim 6, wherein the fastener comprises a bolt having threads, the bolt having a friction-enhancing coating disposed on at least a portion of the threads.

8. The fitting as recited in claim 1, wherein the first coupling portion has a dovetail cross-sectional shape, the second coupling portion having a dovetail cross-sectional shape which is inverted relative to the first coupling portion.

9. A method of attaching two pieces of strut, the method comprising:
    providing a first piece of strut having a fitting side defining a first fitting groove, the first fitting groove having a bottom wall, the bottom wall defining a slot-shaped opening;
    providing a second piece of strut having a fitting side defining a second fitting groove;
    providing a fitting comprising a coupling component configured for attachment to both the first and second pieces of strut and an anti-rotation plate having a locked position relative to the coupling component configured to prevent rotation of the coupling component upon attachment of the fitting to the first and second pieces of strut;
    inserting the fitting in a first orientation into the first fitting groove through the slot-shaped opening;
    inserting the fitting into the second fitting groove after said inserting the fitting in a first orientation into the first fitting groove; and
    rotating the coupling component relative to the anti-rotation plate to a second orientation to connect the first and second pieces of strut to one another such that the fitting sides of the first and second pieces of strut are juxtaposed and face one another, wherein rotating the coupling component causes the anti-rotation plate to be in the locked position relative to the coupling component to inhibit rotation of the coupling component from the second orientation to the first orientation.

10. The method of claim 9, further comprising positioning the first and second pieces of strut side-by-side so that the first fitting groove opposes the second fitting groove, before inserting the fitting into the first fitting groove.

11. The method of claim 10, further comprising positioning the first and second pieces of strut side-by-side so that the first fitting groove opposes the second fitting groove, before rotating the coupling component.

12. A fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, the fitting comprising:
    a coupling component having first and second coupling portions configured for reception in respective fitting grooves of the first and second pieces of strut when the coupling component is in a first orientation relative to the respective fitting grooves, wherein each of the first and second coupling portions are rotatable within the respective fitting grooves from the first orientation to a second orientation to connect the first and second pieces of strut to one another such that the fitting sides of the first and second pieces of strut are juxtaposed and face one another; and
    an anti-rotation plate connected to the coupling component, wherein the anti-rotation plate has an unlocked position relative to the coupling component to allow the first and second coupling portions to be received in the respective fitting grooves, and a locked position relative to the coupling component to inhibit rotation of each of the first and second coupling portions from the second orientation to the first orientation,
    wherein the first coupling portion has a dovetail cross-sectional shape,
    wherein the second coupling portion having a dovetail cross-sectional shape which is inverted relative to the first coupling portion,
    wherein the first coupling portion has a length extending between longitudinal ends and a width extending between sides, the length being greater than a distance between the first and second legs of the anti-rotation plate and the width being less than the distance between the first and second legs.

13. The fitting as recited in claim 12, wherein the anti-rotation plate comprises a base and generally opposing first and second legs extending downward from opposite sides of the base.

14. The fitting as recited in claim 12, wherein when the anti-rotation plate is in the unlocked position, the first and second legs are positioned above the coupling component and extend along the length of the first coupling portion, and when the anti-rotation plate is in the locked position, the first and second legs extend downward along the sides of the first coupling portion and along the width of the first coupling portion.

15. The fitting as recited in claim 12, further comprising a fastener connecting the coupling component and the anti-rotation plate.

16. The fitting as recited in claim 15, wherein the fastener comprises a bolt having threads, the bolt having a friction-enhancing coating disposed on at least a portion of the threads.

* * * * *